(12) United States Patent
Weihrauch

(10) Patent No.: US 7,503,093 B2
(45) Date of Patent: Mar. 17, 2009

(54) METHOD AND DEVICE FOR PRODUCING BRISTLE PRODUCTS AND BRISTLE PRODUCTS

(75) Inventor: Georg Weihrauch, Wald-Michelbach (DE)

(73) Assignee: Geka Brush GmbH, Bechhofen-Waizendorf (DE)

(*) Notice: Subject to any disclaimer, the term of this patent is extended or adjusted under 35 U.S.C. 154(b) by 607 days.

(21) Appl. No.: 10/311,799

(22) PCT Filed: Jun. 28, 2001

(86) PCT No.: PCT/EP01/07439

§ 371 (c)(1),
(2), (4) Date: Dec. 20, 2002

(87) PCT Pub. No.: WO02/03831

PCT Pub. Date: Jan. 17, 2002

(65) Prior Publication Data

US 2003/0163884 A1    Sep. 4, 2003

(30) Foreign Application Priority Data

Jul. 10, 2000    (DE) .................... 100 33 256

(51) Int. Cl.
*A46B 3/04*    (2006.01)
*A46B 9/04*    (2006.01)
*A46D 1/00*    (2006.01)

(52) U.S. Cl. .................. 15/187; 15/167.1; 15/207.2; 300/21

(58) Field of Classification Search ............ 15/167.1, 15/207.2, 185–188, DIG. 5; 300/21
See application file for complete search history.

(56) References Cited

U.S. PATENT DOCUMENTS

| 301,644 A | 7/1884 | Thompson |
|---|---|---|
| 1,924,152 A | 8/1933 | Coney et al. |
| 2,139,242 A | 12/1938 | Mock |
| 2,621,369 A | 12/1952 | Gantz |
| 3,781,403 A | 12/1973 | Hanggi et al. |
| 4,244,076 A * | 1/1981 | Meyer .................. 15/188 |
| 5,040,260 A | 8/1991 | Michaels |
| 5,390,984 A * | 2/1995 | Boucherie et al. ........... 300/21 |
| 5,474,739 A * | 12/1995 | Triestram et al. ........... 422/40 |
| 5,722,106 A * | 3/1998 | Masterman et al. ........ 15/167.1 |

(Continued)

FOREIGN PATENT DOCUMENTS

DE    826 440    11/1951

(Continued)

*Primary Examiner*—Laura C Guidotti
(74) *Attorney, Agent, or Firm*—Browdy and Neimark, P.L.L.C.

(57) ABSTRACT

Brush ware comprising at least one carrier and bristles made from a moldable plastic material disposed thereon, is produced by providing the carrier with through holes acting like spinning nozzles, to which bristle-shaped molding channels join and a plastic melt for the bristles is injected from at least one side of the carrier—the feed side of the melt—through the holes into the channels thereby forming the bristles, wherein the through holes have a minimal width along at least a portion of their length which is $\leq 3$ mm and the ratio between this width and the flow path of the melt resulting from the depth of the through holes plus the length of the channels is $\leq 1:5$. A device for carrying out the method and brush ware produced in accordance with the method is also described.

21 Claims, 15 Drawing Sheets

U.S. PATENT DOCUMENTS

| | | | |
|---|---|---|---|
| 5,926,900 | A | 7/1999 | Bennett |
| 5,946,758 | A * | 9/1999 | Hohlbein et al. ........... 15/167.1 |
| 5,966,771 | A | 10/1999 | Stroud |
| 5,991,957 | A * | 11/1999 | Watanabe ................... 15/167.1 |
| 6,021,541 | A * | 2/2000 | Mori et al. ................. 15/167.1 |
| 6,029,304 | A * | 2/2000 | Hulke et al. ................. 15/105 |
| 6,321,407 | B1 * | 11/2001 | Weihrauch ................ 15/167.1 |
| 6,506,327 | B2 * | 1/2003 | Weihrauch ................... 264/146 |

FOREIGN PATENT DOCUMENTS

| | | |
|---|---|---|
| DE | 941 364 | 3/1956 |
| DE | 2 155 888 | 5/1972 |
| DE | 29 20 931 | 12/1979 |
| DE | 30 35 860 | 4/1981 |
| DE | 40 34 811 | 5/1992 |
| DE | 41 27 621 | 2/1993 |
| DE | 43 02 870 | 8/1994 |
| DE | 195 08 539 | 9/1996 |
| DE | 195 34 368 | 3/1997 |
| DE | 197 49 564 | 5/1999 |
| DE | 198 18 345 | 10/1999 |
| EP | 0 676 268 | 10/1995 |
| EP | 0 893 225 | 1/1999 |
| GB | 788 | 3/1861 |
| GB | 24935 | 12/1896 |
| GB | 2 151 971 | 7/1985 |
| WO | WO 98 03 097 | 1/1998 |
| WO | WO 99/07252 * | 2/1999 |
| WO | WO 99/24649 * | 5/1999 |
| WO | WO 00/64307 A1 | 11/2000 |

* cited by examiner

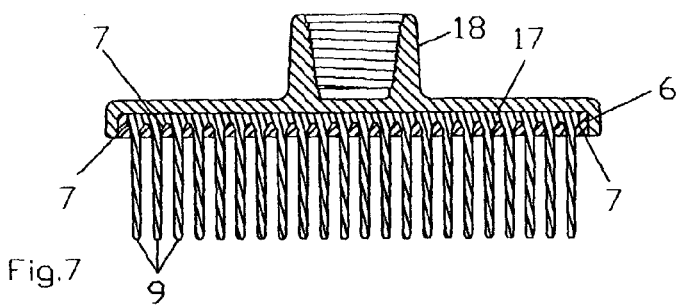
Fig.7
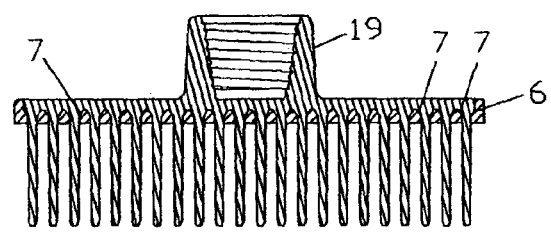
Fig.8
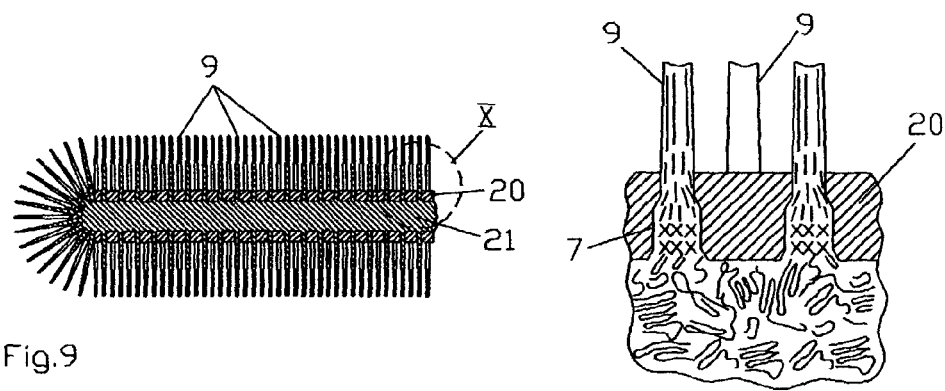
Fig.9
Fig.10
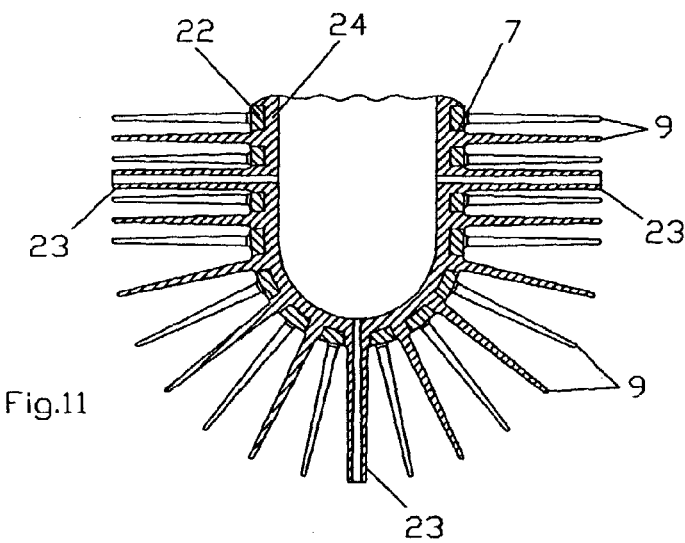
Fig.11

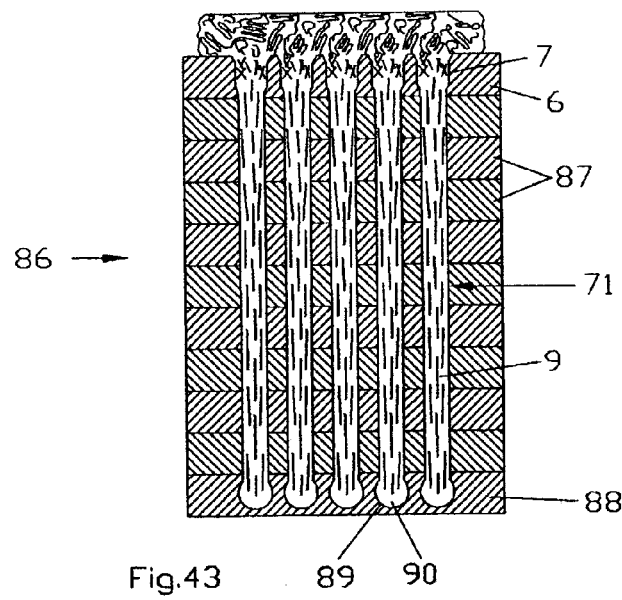
Fig.43
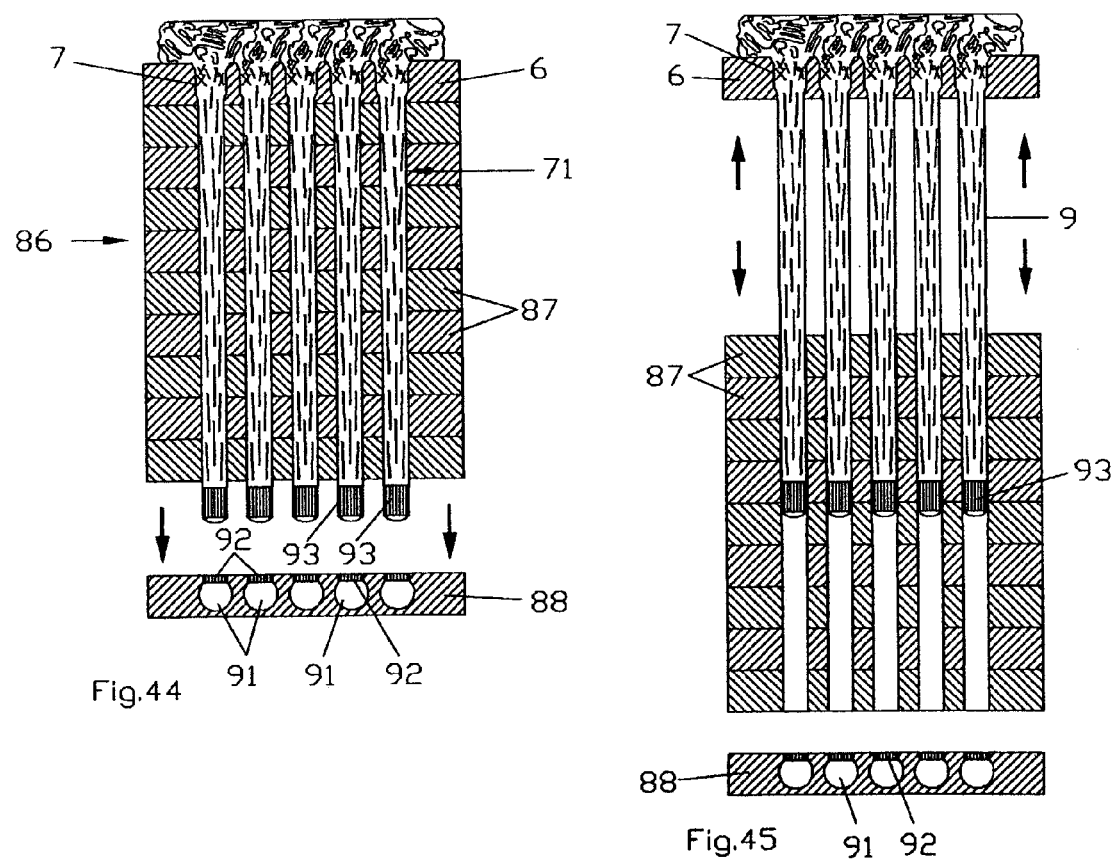
Fig.44
Fig.45

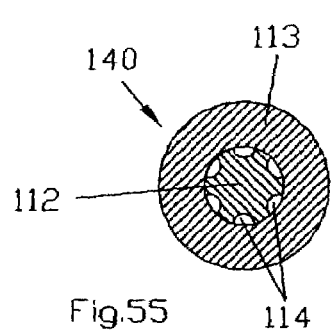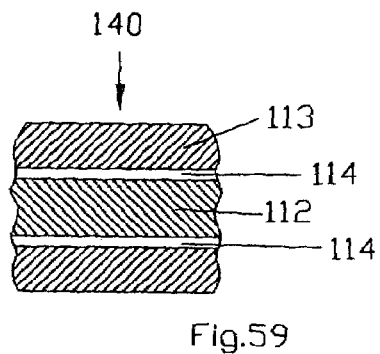
Fig.55 Fig.59
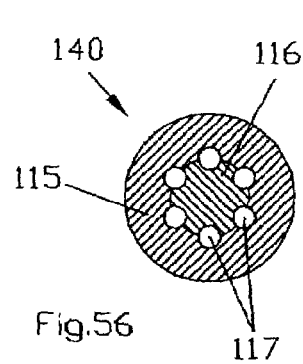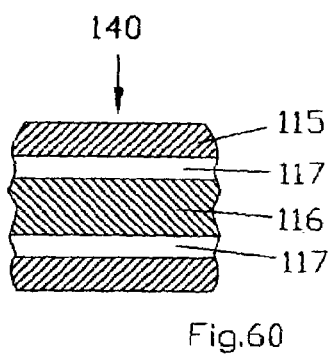
Fig.56 Fig.60
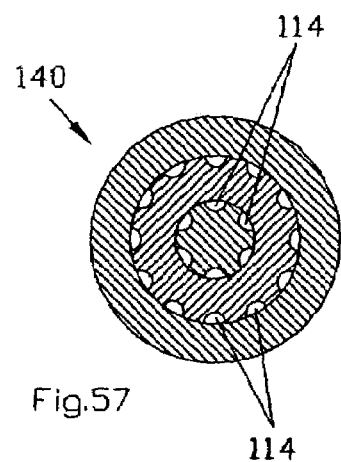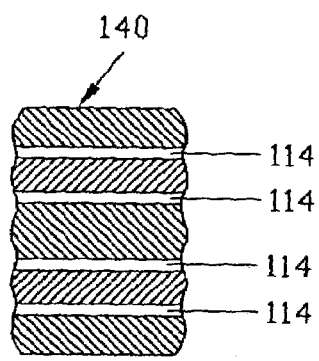
Fig.57 Fig.61
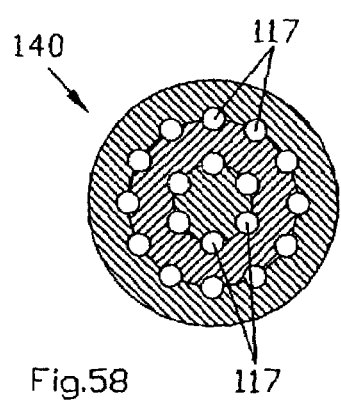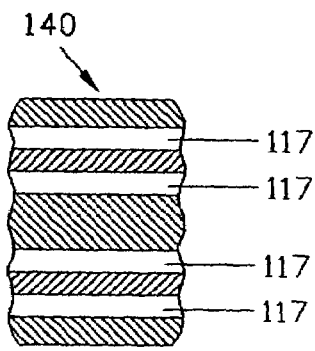
Fig.58 Fig.62

METHOD AND DEVICE FOR PRODUCING BRISTLE PRODUCTS AND BRISTLE PRODUCTS

BACKGROUND OF THE INVENTION

1. Technical Field of the Invention

The invention concerns a method for producing brush ware comprising at least one carrier and bristles made from a moldable plastic material disposed thereon, wherein the bristles are produced from the plastic melt through injection into bristle-shaped molding channels. The invention also concerns a device for producing brush ware and brush ware.

2. Prior Art

Brush ware, in the present case in particular brushes of any kind, paint brushes and brooms, is manufactured mainly mechanically by initially producing the brush carrier with holes and then mechanically introducing the bristle bundles. With the use of plastic materials, the brush bodies have been produced by molding or injection and the bristles have been fastened either in a conventional mechanical fashion or more recently through thermal methods. In any case, the bristle monofilaments must be initially produced in an extrusion or spinning process, the monofilaments must be optionally cut and the bristles must be subsequently fastened to the carrier. With current conventional anchoring technology, the bristles are looped and punched into the brush body using a metallic anchor.

There have been many attempts to streamline the process by producing the bristles or bundles in one piece, together with the carrier, and connecting the carrier to the brush body. More than 100 years ago (GB 788/1861, GB 24 935/1896), one has proposed molding the bristles and a carrier, to which they are connected, using an elastic material such as rubber or the like and to subsequently mount them on an intrinsically rigid brush body. The production of cleaning elements, combined into groups, together with a carrier connecting same in one common injection process and the subsequent connection of the carrier to the brush body optionally in a two component injection method has also been suggested (DE 941 364, GB 2 151 971, U.S. Pat. Nos. 301,644, 4,244,076, 5,040,260, 5,966,771, WO 98/03097). Finally, U.S. Pat. No. 5,926,900 has suggested production of the entire brush body and the bristles as a one-piece, injection molded part.

Brushes of this type were only used in practice for hair care or—to a smaller extent—as throwaway brushes. These brushes are not suitable for many applications, since the bristles of such injection-molded brushes have an unacceptably low bending strength. In contrast to bristles produced in a spinning process, they do not have the molecular structure required for stability, which is mainly characterized by a longitudinal orientation of the molecular chains, in a bristle-parallel manner. For this reason, they must be primarily regarded as working or cleaning elements rather than bristles. The lack of stability is particularly noticeable in the region where the working elements are connected to the carrier, where orientation of the molecules is completely missing. In consequence thereof, the working elements, which are properly aligned directly after production, will change their positions after a short period of use and tend to bend, break and not to re-erect (bend recovery). This technology further requires use of the same plastic material for the working elements and the carrier. This leads to increased costs since high quality bristles must be produced from high-quality plastic materials. Every effort to reduce costs necessitates a compromise in the selection of the plastic material. Since the considerable disadvantages concerning use always remain, brushes of this type are suitable for few applications. A differentiation between the carrier material and that for the bristles or among the bristles in dependence on the respective requirements is not possible, in particular with regard to mechanical strength, coefficient of friction, color etc.

Brushes are also known (U.S. Pat. No. 2,621,639) having working elements ("pins") which are not actual bristles rather pins, bolts, strips or the like. They are injection-molded elements, which consist mainly of rubber or rubber-elastic plastic materials, e.g. elastomers, and have a larger cross-section and frequently also a shorter length than bristles. This compact construction of the "bristle" in this type of brush is absolutely necessary for two reasons: to obtain satisfactory stability and fatigue strength and to prevent the molding channels from being too narrow and deep for an injection having sufficient mold filling as well as to permit removal. The characteristic properties of these "pins" are that they have a soft effect on the surface treated and an increased coefficient of friction, i.e. they effect a type of stroking and massaging and not an active brushing. A typical field of application is hairbrushes, which mainly serve for separating and arranging hair and are supposed to only massage the skin of the head. The rigidity of these elements can only be substantially influenced by the diameter and the diameter/length ratio as well as by the hardness of the plastic. The brush according to U.S. Pat. No. 2,621,639 is produced through injection molding by inserting a thin flexible carrier plate with a perforation into an injection mold in correspondence with the arrangement of the working elements, wherein the mold has a plurality of channel-like molding cavities which join the perforated holes of the carrier and serve to shape the pin-shaped working elements. The opposing side—the injection side—is provided with distributing channels which guide the plastic melt, e.g. nylon, to the individual perforated holes and into the adjacent molding channels. The molding channels are widened directly after the perforations of the carrier to produce a thickening on both sides of the thin carrier plate for axially fixing the working element in both directions. Although the nylon used would be suitable to achieve bristle-like properties, this is not utilized herein, since production of a longitudinal molecular structure is not possible, at least at the foot of the cleaning elements, due to the thickening. The same is true for another known hair brush (EP-B1-0 120 229) wherein a carrier is initially injected having sleeve-shaped conical protrusions and a further plastic material is then injected into the sleeves as a core which abuts the open sleeve end with a thickening. On the rear side, the cores are connected via a second carrier plate of the same material. This procedure is primarily intended to produce a positive, axially stable connection between both parts and makes the working elements bulkier.

Cleaning elements of this type are also known for toothbrushes and brooms (U.S. Pat. Nos. 5,040,260, 5,966,771). These brushes are formed in two parts. Finally, toothbrushes are known (U.S. Pat. Nos. 1,924,152, 2,139,242, DE 826 440, WO00/64307) wherein the bristle support consists of a combination of conventional bristles with proven, good cleaning effect and bolt or pin-like cleaning elements of rubber-elastic plastic material.

OBJECT AND SUMMARY OF THE INVENTION

It is the underlying purpose of the present invention to propose a method and a device for the production of brush ware wherein the known advantages of injection technology can be utilized while permitting production of brush ware whose bristles have the same quality and usage properties as spin-injected bristles.

On the basis of the known method, wherein the bristle-like working elements disposed on a carrier are produced through injection of a plastic melt into channels shaping them, the object in accordance with the invention is achieved in that, the carrier is produced having through holes acting like spinning nozzles (spinneret) and the holes, to which the channels connect, have a minimum width of ≦3 mm along at least a portion of their depth, wherein the ratio between this width and the melt flow path, resulting from the depth of the through holes and the length of the channels, is ≦1:5, and the plastic melt is injected from at least one side of the carrier, the introduction side of the melt, through the holes and into the channels to form the bristles.

The above-mentioned ratio is preferably smaller than/equal to 1:10. The lower limit of this ratio can be in the region of 1:250.

The inventive method paves a new path for the production of brush ware. The support on which the bristles are disposed and which can form the brush body itself or part of it, e.g. in the shape of an insert or the like, simultaneously serves as a throwaway "tool" for producing the bristles through injection molding. Due to dynamic effects and wall friction, a tensile flow is produced at the holes, acting like a spinning nozzle, which has relatively high shearing forces in the region close to the walls. These cause the molecular structure to be oriented in the flow direction within the melt or the plastified material and continuing into the bristle-forming channels, wherein the ratio between the narrowest portion of the through holes and the flow path length of the melt, selected in accordance with the invention, optimizes longitudinal molecular orientation. This self-reinforcement of the bristles through orientation of the molecular chains in the longitudinal direction is particularly apparent for partial-crystalline thermoplastic materials. Moreover, in contrast to brush ware produced as a single piece, the brush ware produced in accordance with the invention disposes a short partial length of the bristle, i.e. its root or base, in the carrier wherein it is supported. This root region is the most sensitive region with respect to rigidity since the molecules are not or only slightly oriented at this location. This stabilization produces not only a higher bending strength, in particular bending fatigue strength, but also a higher tensile strength. With respect to conventional brushes molded in one piece, the bending strength of the bristle required for a predetermined deflection can be increased by 40% and more and the modulus of elasticity is considerably increased. Since the tensile strength is also considerably increased, bristles having a small cross-section and large length can easily be removed from the mold.

In principle, the method in accordance with the invention can be used to process all moldable plastic materials. However, in view of the required properties of the bristles, thermoplastic or thermoelastic materials or mixtures (alloys) thereof are preferably used since these plastic materials also exhibit an optimum molecular orientation.

In principle, any material can be used for the carrier, in particular plastic materials having mechanical properties different from the bristles, plastic materials with other modifications, colors or the like, but also non-plastic materials such as wood, metal or the like. The through holes can be produced through casting, melting, lasering, injection molding, punching, drilling or the like in dependence on the material of the carrier. They can be provided in any arrangement. If the arrangement is closely spaced, which is possible with the inventive method, the bristles are correspondingly close together in the form of bundles, strips or packages. Alternatively, the holes can also be widely spaced apart to produce individually standing bristles having a larger separation from one another. It is also possible to combine such arrangements and produce a bristle stock of any configuration. Finally, the through holes can also have an axially parallel profile to impart a longitudinal profile to the bristles.

In a preferred embodiment, the through holes themselves are designed with a transverse and/or longitudinal section and/or the injection pressure is selected in such a manner that the melt passing the through holes experiences a longitudinal molecular orientation at least in the peripheral region of the bristles, such as that which occurs during the spinning of bristle monofilaments.

The extent of the longitudinal molecular orientation can be influenced by the cross-section and by the absolute depth of the holes. The narrower the cross-section and the larger the depth of the holes, the higher the shearing flow when injecting the melt. The injection pressure or the injection speed also influences the shearing flow. It has been shown in the inventive method that the higher the injection speed, the higher the bending strength of the bristle, in particular when taking into consideration the smallest hole width and the ratio between this width and the flow path of the melt.

The shape of the through holes in the radial and axial direction can also influence the formation of shear flow. When the through holes have a profiled cross-section, the shearing flow in the profiled contours is larger than in the core. A decreasing cross-section from the injection side to the opposing side produces a steeper speed profile on the outlet side. Conical or stepped narrowing produces a tensile flow, which aligns the molecular chains in longitudinal orientation.

The through holes in the carrier preferably have a depth which is such that the injected through bristles are surrounded by the carrier in that region where the longitudinal molecular orientation is insufficient. This is e.g. the region where the bristles are connected.

The inventive method also permits the bristles to be injected with different lengths such that the ends of the bristles on the finished brush form an envelope surface which is not flat.

The through holes in the carrier, acting like spinning nozzles, produce a longitudinal molecular orientation independent of the bristle length such that bristles of differing lengths also have identically good bending behavior and restoring capacity. The molding channels for the bristles can be defined very precisely to produce an exactly predetermined topography on the complete bristle stock, tailored to the respective use of the brush. With conventional brushes, in particular toothbrushes, this topography is produced through mechanical processing methods, which do not permit high precision.

The bristles can also be formed through injection, having ends of different shapes to tailor the effect of individual bristles or of the entire bristle stock to the intended use.

In a further method variant, the plastic melt for the bristles is annularly guided at the through holes to produce hollow bristles.

In this case, the plastic melt is annularly injected through the openings and into the channels. Hollow bristles are produced which are either open or closed at their free end. In the first case, they have the shape of channels wherein the wall friction produces a molecular orientation not only on the outside but also on the inner walls of the hollow bristle. The hollow bristle can optionally be filled with any fillers suitable for the application.

As an alternative, after injection and removal of the hollow bristles from the mold, a further plastic melt is injected into the hollow space of the bristles to produce a core bristle which also has a longitudinal molecular orientation on its surface due to the shear flow at the inlet of the hollow bristle and friction on its inner wall.

This produces a multiple component bristle, wherein the plastic components can again be matched to the application. The core filling the hollow bristle can consist of an inexpensive and/or rigid material with the outside being matched to the purpose of use of the brush ware to e.g. serve as working layer for producing a stronger polishing or grinding effect. The outside can also form a softer working layer. When such a layer is worn off, the inner core is exposed and constitutes an indication of wear, in particular when the core and jacket have different colors. The inner wall of the hollow bristle or the injected core can also be profiled to improve adhesion. The increased surface also results in increased wall friction for the melt flow to further support longitudinal molecular orientation.

The hollow bristle can be injected to have perforations and the further plastic melt for the core bristle can be injected through the perforations to project past the bristle. This produces different structures on the surface of the bristle in dependence on the shape of the projections and selection of the material. The projections can have the shape of a nub, a finger or a thread. Through appropriate dimensioning, the perforations can act like spinning nozzles.

It is also possible to initially extrude the core bristle and to subsequently at least partially surround it by an injected plastic melt to form a hollow bristle.

In a further preferred embodiment, the melt feed side of the support is provided with at least one depression and at least one hole extending therefrom to the opposite side, wherein this depression is at least partly filled with the plastic melt of the bristles during injection.

This produces a corresponding melt reserve for supplying additional melt into the bristles as needed. In addition, this interconnects the rear parts of the bristles either completely or partially and thereby effects positive fixing in opposition to pullout forces. If the bristles do not weld to the wall of the openings, any pullout forces are transferred to and absorbed in this plastic material reserve on the rear side of the carrier. The depression can extend continuously across the side of the carrier facing away from the bristles or could be disposed in the form of channels arranged at separations from each other to form a crossed grid leading into the holes. After the bristle material is injected, the back portions of the bristles are connected together via the optionally flexible strips or grids in the depression. Since only the bristles must normally be made from a high quality plastic, a cost effective structure is obtained which can also serve a decorative purpose on the backside of the carrier.

In another embodiment, a carrier defining a space, e.g. an at least partially cylindrical carrier, is produced with openings acting as spinning nozzles and the plastic melt for the bristles extrudes through the openings from the inside.

This permits production of brushes having a curved carrier, wherein, in contrast to mechanical fastening methods, a precise alignment and arrangement of the bristles, optionally including a suitable topography of the bristle ends, can be achieved.

In accordance with an embodiment of this method, the carrier is produced as a tube section, wherein the plastic melt for the bristle is injected through the holes from the inside.

This permits production of round brushes, mascara brushes etc., and also of any topographical shapes of the brushing surfaces using bristles of differing lengths. This could not be realized at all or only inadequately for round brushes using conventional techniques.

If the tube section is closed at least at one end, production of e.g. toilet brushes, bottlebrushes or the like can be produced in accordance with the inventive method.

The hollow space, which is defined by the carrier, can be at least partially filled with the plastic melt for the bristles. If the support has a small cross-section, e.g. in the case of mascara brushes, the carrier can be completely filled to thereby obtain a massive object. If the cross-sections are larger, only parts, which are particularly stressed, can be filled. It is also possible to shape the partial filling as reinforcing ribs or the like or with channels for introducing material to or between the bristles.

The carrier is preferably produced from plastic material through injection. It can be prefabricated and introduced into an injection mold comprising the channels.

In a further preferred method variant, the carrier and the bristles are produced in a multi-component injection method wherein, after injection of the carrier with the holes, the plastic melt for the bristles is injected through the holes.

In this fashion, the carrier and bristles can be produced in one single injection tool. In many cases they can constitute the entire brush. Optionally, the carrier with the bristle stock can be covered in a multi-component extruder or in two or more injection steps to e.g. also cover the rear side of the bristle support for forming a larger bristle body or optionally simultaneously a handling means, a handle or the like. The carrier body and bristles can be made from differing plastic, from filled or unfilled plastic or from differently colored plastic.

The openings can be introduced into the carrier to be aligned with the channels or at an angle thereto such that the bristles can have any orientation with respect to the brush body of the finished brush.

The openings are preferably produced with a cross-section tapering from the feed side for the melt towards the opposing side, preferably in steps, to produce a spinning nozzle-like flow profile.

The openings can also be provided with inlet slopes on the feed side for the melt to widen and stabilize the bristle root within the carrier and, at the same time, obtain a tensile flow.

The openings can furthermore be provided with a collar on the feed side of the melt and/or on the opposing side, wherein an inner collar, together with the plastic material filling the depression, leads to a deepening in the region of the bristle foot, and an outer collar facilitates a lengthened bonding of the bristles in the carrier. Both measures produce shear flow along a longer path within the carrier.

The openings in the carrier preferably have a longitudinal and/or transverse profile. This permits production of a profiled working surface on the outside of the bristle, in dependence on the application for the brush ware. The increased surface area also increases wall friction and thereby amplifies the shear flow.

The carrier can have one layer or, at least in portions, multiple layers or also be formed of surface segments which can consist of different materials. It can also be flat or have any curvature.

The bristles can also be injected from at least two differing plastics.

In a preferred embodiment, the through holes are fashioned in the carrier in correspondence with the arrangement of the bristles in the completed bristle stock of the brush ware wherein, as indicated above, it is possible to select arrangements of bundles, strips or packets or individual bristles or also a combination thereof.

In a further preferred embodiment, the bristles injected through the carrier are subsequently stretched as is conventionally known per se for bolt-like working elements (DE 21 55 888). This can be effected directly after injection and within the injection tool through an appropriate displacement of the tools or after ejection in a subsequent working operation. Stretching in response to tensile forces produces further orientation of the molecules in the longitudinal direction. In addition, alternating flexing forces can be used to increase the flexibility of the bristles by likewise effecting molecular orientation. This can provide a certain degree of reserve flexibility for subsequent bending of the bristles during use.

In order to facilitate the stretching via application of tensile forces, a protrusion, e.g. a thickening, can be injected at the ends of the bristles. Stretching is produced through a tensile force extending the separation between carrier and protrusion, thereby permitting simultaneous deformation of the thickenings to align them with the bristles. It is also possible to extrude protrusions which connect together some or all of the bristles and which are separated at a later time. Stretching can be effected in one step or also in several steps thereby reducing the tensile force for each step. Stretching can optionally be confined to portions of the bristle.

Instead of or in addition to stretching it is also possible to provide stabilization, e.g. thermally or chemically or also through modifications in the plastic material. The injected through bristles thereby obtain stability values which are even closer to those of extruded or spun bristles.

If the support and the bristles are produced from the same plastic material, the injection process can be controlled such that the bristles are welded to the support. The same is true when using different plastic materials having sufficient affinity to one another. In this case the plastic materials for the carrier and the bristles are selected or modified such that they withstand the respective stress, wherein thermoplastic materials of higher quality are usually used for the bristles. Welding or melting of the bristles to the support produces a gap-free connection. Such a brush meets the highest hygienic demands, required e.g. for tooth brushes, medical-therapeutic brushes or brushes which can be used for the processing and treatment of food. These applications can be further supported if plastic with antibacterial properties is used for the bristles and/or support.

At least the bristles can comprise a plastic material, which influences their chemical, physical, mechanical or usage properties. This could be a filled plastic material, e.g. filled with particles, fibers or the like. The fibers of a fiber-filled melt also align in the longitudinal direction when injected through the openings thereby additionally supporting the intrinsic reinforcement of the bristle obtained through the molecular orientation. Fibers or fillers can be made from the same polymer as the melt and be mixed therein or optionally be modified to increase the melting point such that they remain solid in the melt and give the bristle a surface structure. If the melting points of bristle and fiber material are close, the bonding is improved through surface melting. The stabilizing effect of the fibers is particularly high when they are produced from a spun monofilament.

The invention also concerns a device for producing brush ware with at least one carrier and bristles disposed thereon, made from a moldable plastic material, consisting of an injection mold having a feed channel for the plastic melt, a joining space for the carrier and molding channels extending from this space into which the melt is injected. A device of this type is known for one-piece injection of carrier and bristle-like working elements (GB 2 151 971 A).

In accordance with a first solution of the inventive object, such a device is characterized in that a carrier with holes, formed like spinning nozzles and having a minimum width along at least a portion of their depths which is smaller than/equal to 3 mm, can be inserted into the space to which the through holes are adjacent, with the through holes joining the molding channels and forming the connection between the molding channels and the feed channel for extruding the plastic melt into the molding channels, wherein the ratio between the smallest width of the through holes to the combined length of the channels plus the depth of the through holes is smaller than/equal to 1:5, preferably smaller than/equal to 1:10 to 1:250.

The carrier of any material is conventionally provided with openings through casting, injection or mechanical treatment processes and inserted and positioned in the molding space of the injection mold such that the openings are disposed upstream of the channels and preferably directly abut them to produce a connection between the feed channel for the melt and the molding channels forming the bristle. During an injection cycle, the melt enters from the feed channel into the molding space and through the openings of the carrier into the channels. The molecules in the melt or in the plastified material are oriented in a longitudinal direction in the openings due to their spinning nozzle properties. This effect extends into the channels. The less oriented root region of the bristles having a lower bending and tensile strength is bound to the carrier.

Another device in accordance with the invention provides that part of the multiple-part injection mold comprises a further feed channel for a plastic melt opening into the molding space and a cavity for extruding the carrier, with through holes acting as spinning nozzles, and with a plurality of movable pins corresponding to the number of openings which, in a first injection step, penetrate through the cavity for the carrier and close the molding channels and which are retracted from the cavity in a second injection step. In the first step, the carrier with openings is injected. After removing the pins in the second step, the bristles are injected through the exposed openings.

Alternatively, a means can be provided to move the carrier which was injected in the cavity, to the molding space and to position it therein such that the openings are approximately aligned with the molding channels to form a connection between the molding channels and the feed channel for injection of the plastic melt into the channels.

In a third variant, the carrier is initially injected in the molding space optionally in several stages and then positioned in front of a further injection mold having the bristle-forming channels and the melt for the bristles is then injected through the carrier.

In all the above mentioned embodiments of the device, the carrier is made of a moldable plastic material and is produced with its spinning nozzle-like openings in a corresponding cavity of an injection mold and subsequently, as in conventional multiple component injection, the second plastic material component for the bristles is injected either in the same mold or in an additional mold following transfer of the carrier or the mold and carrier. This produces a high cycle time for suitable adaptation of the injection molding installation. If the plastic materials of carriers and bristles have sufficient affinity, they are welded in the region of the openings. In all cases, the through holes have a minimum width along at least a portion of their length which is smaller than/equal to 3 mm and the ratio between this width and the length resulting from the depth of the openings and the length of the channels is smaller than/equal to 1:5, preferably $\leq$1:10. The same effects and advantages are achieved as in the above-mentioned device.

All variants of the device can provide that the carrier has at least one depression on the side of the feed channel from which the openings start, which receives part of the plastic melt of the bristles.

Either the carrier with the depression is prefabricated to be subsequently inserted into the shaped space, or the depression is formed onto the support during injection of the first component. During subsequent injection of the bristles, the depression is at least partially filled with the second component forming the bristles to connect the bristles at their bases. In this context, the term "depression" means any type of cavity for connecting the bristles. It can completely envelope all rear portions of all bristles or consist essentially of individual bridges or bridges disposed like a grid, to interconnect the bristles. The melt reserve in the depression can supply additional melt to the bristles in response to subsequent pressure in the injection unit. In the solid state, it produces a type of positive connection between bristles and carrier and accepts at least part of the pullout forces acting on the bristle. It can also, together with the carrier, form the bristle body. Since the carrier is clamped in the injection mold, the plastic melt for the bristles can be injected at large pressures even when the carrier is not yet completely rigid or is made from a yielding plastic material, e.g. an elastomer, since the spinning-nozzle openings maintain their shape.

In addition, at least a portion of the molding channels can have a cross section at their openings facing the carrier which is tapered relative to the cross section of the associated hole which leads to an additional confinement of the melt flow and associated longitudinal molecular orientation.

The molding channels can have differing lengths to obtain a contoured working surface at the bristle ends of the finished bristle stock. The openings can optionally have differing separations from one another and differing cross-sections to obtain a correspondingly dense or less dense arrangement of bristles of optionally differing strengths on the finished bristle stock.

The molding channels can have differing end contours, e.g. a more or less spherical indentation, or extend towards a point. The end of the molding channel can also terminate in several thin capillary channels to produce a type of finger bristle.

A further embodiment provides that the molding channels open, in the region of their ends, into an enlarged cavity for forming a bristle head with a larger cross-section or for forming a protrusion at the ends of the bristles. In the latter case, means are provided for increasing the separation between the carrier and the protrusion to stretch the injected through bristles.

Similar to the extrusion of monofilaments, the inventive design of the device permits improvement of the injection-molded bristles after production by increasing the longitudinal orientation of the polymer molecules through subsequent stretching either the entire length or partial lengths of the bristles. This provides the bristle with excellent bending strength and particularly bending fatigue strength while thereby increasing the modulus of elasticity. In this manner, even injected through bristles maintain their shape during prolonged use. The surface hardness is also improved and even localized external forces during use do not cause surface defects and associated locations, which are susceptible to bending over. This is true for crystalline or partially crystalline polymers in particular, and also for more or less amorphous polymers to a corresponding extent.

In a particularly advantageous embodiment, the means for increasing the separation are formed by the means for opening and closing the injection mold. Depending on the desired or possible elongation of the bristle through stretching and in dependence on the dimensions of the cross-section, a larger or smaller portion of the opening motion of the injection mold can be used for stretching. After stretching, the protrusions on the bristle ends produced during injection molding, are separated and disposed of. The free bristle ends can be mechanically treated e.g. through grinding or made round or conical in another fashion. If the protrusions are disposed only at the end of each individual bristle, they can also be deformed into a bristle bundle during stretching.

In a further preferred embodiment, the walls of the space opposite to the molding channels are provided with pin-shaped sliders which can be introduced through the openings of the carrier into the molding channels at a separation from their walls while forming an annular space between themselves and the hole, and which are removable following injection of the plastic melt through the annular space to form hollow bristles, wherein the molding channels and/or pins are formed and disposed such that open or closed hollow bristles are produced.

In a second injection step, a further plastic melt can be injected into the hollow bristle or into a part of it to form a core bristle.

The spinning-nozzle like openings in the carrier are preferably aligned with the molding channels of the injection mold. They can also be disposed at an angle with respect to the associated through holes in the carrier. Combinations of both are also possible.

In a further advantageous embodiment, the molding space for injection molding of the carrier with the through holes comprises shaping elements for forming collars which extend the openings on one or both sides to form elongated through holes or for forming inlet and/or outlet slopes on the holes. These measures primarily serve to define flow guidance for generating the desired longitudinal molecular orientation. Particularly for thin carriers, they also increase the length of the anchoring of the bristles in the carrier.

The through holes and the molding channels can have a longitudinal and/or transverse profile. The longitudinal profile serves for producing correspondingly profiled bristles and for improving shear flow. The transverse profiling of the through holes is designed to improve the bonding of bristle base and the transverse profiling of the molding channels of a corresponding profiling of the bristles.

The molding channels preferably have a cross-section that continuously tapers towards the end to provide the bristle with bending angles that change along their lengths. This measure further supports removal of the bristles from the mold.

The molding channels can taper towards their ends either continuously or in steps. Each step creates a tensile flow to support the molecular alignment. The finished bristle has a stepped contour.

An additional shaping cavity may be provided for or be made accessible in various ways. Examples thereof are a multi-part injection mold or another injection mold cooperating therewith. Together with the carrier, this defines a molding space for extruding a bristle body and optionally a handle or a handling means such that the complete brush ware can be produced in a multiple component injection mold.

In a particularly preferred embodiment, the part of the injection mold having the molding channels comprises parallel-layered plates with neighboring plates forming one molding channel or a series of molding channels, wherein the plates can be separated from one another for removing the bristles from the mold.

The very thin and long bristles require correspondingly long molding channels with a very narrow cross-section which cannot be produced in a conventional fashion through drilling, erosion or the like. The inventive layered construction of the injection mold permits each shaped plate to form only one part of the overall molding channel. These open channels can be easily generated using conventional metal processing methods such as shape grinding, electro-erosive grinding, lasering or the like. The open channels of pair wise neighboring shaped plates cooperate to form the complete shaped channel. The layered structure permits—starting from one side of the injection mold—slight displacement of individual shaped plates with respect to one another for simplifying removal of the bristles from the mold. Separation by only a few μm is sufficient.

A further preferred embodiment provides that the part of the injection mold comprising the molding channels consists of plates layered transverse to the molding channels which can be displaced, individually or in groups, along the direction of the molding channels and/or transverse thereto.

This embodiment has the substantial advantage of ventilating the molding channels at the separation planes between plates such that air contained in the molding channel can be easily exhausted at several locations during penetration of the melt at high injection speeds without requiring separate ventilation openings at the end of the molding channel which would influence the shape of the bristle ends. This design has the further advantage that mold removal throughout the length of the bristle is possible through successive displacement of the plates—starting with the plate at the end of the molding channel—such that the forces acting on the bristle during mold removal are reduced while nevertheless remaining localized.

This layered construction of the plates and displacement thereof can also be utilized for stepped stretching of the injected through bristles, optionally limited to certain regions of the bristle.

Transverse displacement of the plates can be used to bend the bristles by stretching them proximate to their surfaces. Alternating bending generates a certain degree of reserve flexibility in the bristles to improve their flexing behavior and ability to remain upright (bend-recovery). Transverse displacement can also be used to cut the bristles, in particular with the plate accommodating the ends of the molding channel.

This layered design furthermore permits exchange of individual plates, in particular of the plate forming the end of the molding channel. This plate can be replaced by a plate having another shape cavity at the end of the molding channel to permit changes in the bristle ends. This end plate can, in particular, also define the shape cavity for forming protrusions at the bristles to assist stretching. The other plates can also be exchangeable to vary the shape of portions of the bristle.

To permit mold removal of profiled bristle ends, at least the plate forming the end of the molding channel consists of parallel layered segments with neighboring segments each forming a molding channel or a series of molding channels wherein the segments can be separated for removing the bristle ends from the mold.

In accordance with an additional embodiment, the mold with the molding channels is at least partially constructed from concentric mold elements that define molding channels, of corresponding concentric configuration, along their mutually facing peripheries. In this manner, the bristles can be disposed in bundles or the like which can also be confined to only portions of the bristle stock.

The method and the device in accordance with the invention provide, for the first time, unlimited completely automatic manufacture. Partially completed products are completely eliminated and finished products are substantially eliminated from stock supplies. The carrier and brush materials are transferred from the storeroom for the raw materials (plastic granulate, dyes and other additives) to a preferably multi-component injection-molding machine. Bristles are no longer manufactured separately, rather within the injection device, e.g. in a second processing step. The installation control system can include automated tool exchange for the exchange of portions of tools or for entire tools. One can essentially begin production directly following receipt of the order to manufacture and deliver "just in time".

The invention finally concerns brush ware comprising a carrier and bristles, injected from a thermoplastic or thermo elastic plastic material, disposed thereon, characterized in that the carrier defines at least one hole, which has a minimum width of $\leq 3$ mm along at least a portion of its depth, each hole receiving one injected through bristle having a maximum extension transverse to its axis of $\leq 3$ mm, wherein the ratio between this transverse extension and a bristle length is $\leq 1:5$, preferably $\leq 1:10$ to $1:250$. The cross-section of the bristles advantageously corresponds to the cross-section of the through holes but may also be smaller than it.

Moreover, at least one part of the bristles can be hollow and the free ends of these bristles can be open or closed. They can also surround a core bristle, which fills them and is preferably made from another plastic material.

The hollow bristle can also be perforated and the core bristle which it surrounds can engage through perforations thereby forming projections on the outside of the bristles which could be pin-like projections of a softer or harder material.

In a further embodiment, at least part of the bristles comprise finger-like projections which are directly formed on a single-piece bristle or, for a hollow bristle, are formed by injection of the core bristle material. through a corresponding perforation.

Advantageously, at least part of the bristles comprises a plastic material filled with particles and/or fibers. While the fibers primarily additionally reinforce the bristles, which have been self-reinforced by longitudinal molecular orientation, the particulate fillers can be chosen in dependence on the application, e.g. for effecting an abrasive or polishing effect for the bristle surface. The particles can also be color pigments, effective components or the like, wherein in particular particles having a hygienic or therapeutic effect are suitable which become effective e.g. through adding moisture.

In accordance with a further embodiment, at least part of the bristles can have structures which extend substantially parallel to the axis and reduce the secondary binding forces transverse to the molecular orientation to effect, under random mechanical pressure or when using the brush ware, break-up of the bristles along the structures into flags, fingers or the like.

Moreover, at least part of the bristles can consist of an energy-conducting plastic material to generate electrical or magnetic fields on the outer portions of the bristles, in particular during use. The bristles can also consist of a transparent light-guiding plastic material, preferentially in their core region only. The coupling of light, in particular laser light, from the rear, transports the light to the bristle ends to trigger photochemical reactions or the like.

In accordance with a further embodiment of the invention, the carrier has at least one depression. At least one hole extends from each depression and the depression is filled with the plastic material of the bristles.

The depression can be one continuous depression or grating-like depressions in the shape of strips or grids which are filled with the bristle material during injection of the bristles and from which the melt is injected through the through holes to generate strip or grid shaped support structures for the bristles on the back of the carrier which can be stiff or flexible in dependence on their configuration and dimensioning.

The support and/or the bristles can consist of differing plastic materials that are matched to the differing requirements for the carrier and the bristles.

At least portions of the carrier can have several layers and consist in particular at least partially of a flexible and/or rubber-elastic plastic material to permit adjustment to the surface to be brushed.

Since the bristle and the carrier are joined together without gaps, the brush ware satisfies the most stringent hygienic requirements, which are further enhanced when the bristles and/or carrier comprise plastic having antibacterial properties.

BRIEF DESCRIPTION OF THE DRAWINGS

The invention is described below with respect to some embodiments shown in the drawing, wherein

FIG. 1 shows a partial cross-section of a carrier and bristles unit, injected in a conventional manner as one piece;

FIG. 2 shows an enlarged view of the detail II of FIG. 1;

FIG. 3 shows a partial cross-section corresponding to that of FIG. 1 of a first embodiment of brush ware produced in accordance with the invention;

FIG. 4 shows an enlarged view of the detail IV of FIG. 3;

FIG. 7 shows a longitudinal section of an embodiment in the form of a broom;

FIG. 8 shows a longitudinal section of another embodiment corresponding to FIG. 7;

FIG. 9 shows a partial cross-section of a cylindrical brush;

FIG. 10 shows an enlarged view of the detail X of FIG. 9;

FIG. 11 shows a partial section of a brush head;

FIG. 34 shows a partial cross-section XXXIV-XXXIV in accordance with FIG. 33;

FIG. 43 shows another embodiment of the injection mold in accordance with FIG. 40 in the injection phase;

FIG. 44 shows the injection mold in accordance with FIG. 43 in a first removal phase;

FIG. 45 shows the injection mold in accordance with FIG. 43 in a further removal phase;

FIG. 55 shows a first embodiment of a shaping element of an injection mold in cross-section;

FIG. 56 shows a second embodiment of a shaping element of an injection mold in cross-section;

FIG. 57 shows a third embodiment of a shaping element of an injection mold in cross-section;

FIG. 58 shows a fourth embodiment of a shaping element of an injection mold in cross-section;

FIG. 59 shows a partial longitudinal section of the mold element in accordance with FIG. 55;

FIG. 60 shows a partial longitudinal section of the mold element in accordance with FIG. 56;

FIG. 61 shows a partial longitudinal section of the mold element in accordance with FIG. 57;

FIG. 62 shows a partial longitudinal section of the mold element in accordance with FIG. 58;

DETAILED DESCRIPTION OF THE PREFERRED EMBODIMENT(S) OF THE INVENTION

Figure 1:
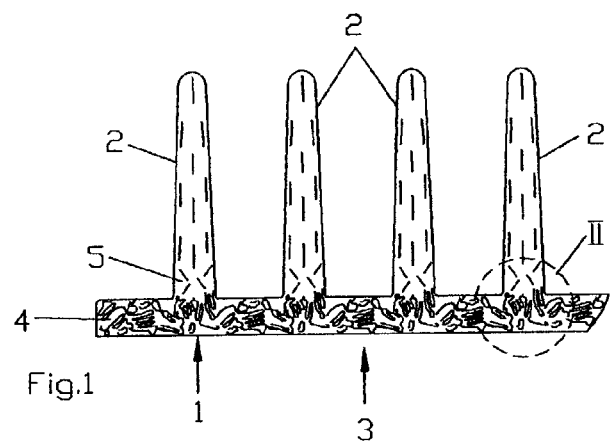
FIGS. 1 through 4 show prior art.
Figure 2:
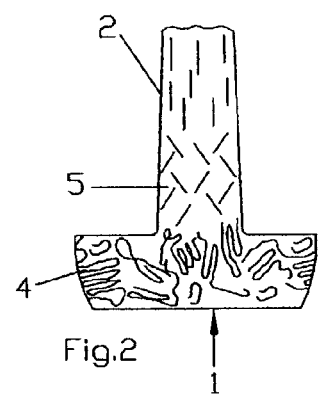

FIGS. 1 and 2 are partial cross-sections through brush ware, e.g. a section in the region of the head of a tooth brush, which has been conventionally produced as a single piece through injection molding (e.g. U.S. Pat. No. 5,926,900). It comprises a carrier 1 and parallel bristle-like working elements in the form of "bolts" or "pins" which extend conically from the carrier towards their free end. The support and working elements are produced in an injection mold having a cavity corresponding to the finished brush ware. During feeding of the plastic melt in accordance with the arrow 3, that part of the cavity which forms the support is initially filled, and the molding channels for the working elements 2 are subsequently filled, thereby producing working elements having a large diameter and a relatively large diameter to length ratio. The polymer molecules in the melt have an irregular and knotted structure, which substantially remains, in the region of the carrier 4. As indicated in the transition region 5, the molecular chains are longitudinally oriented to a certain extent when they enter the molding channels for the working elements 2 due to the reduction in the cross-section. The wall friction produces a shear flow along the further melt path, which also produces a certain degree of molecular orientation, at least in the outer region near the surface of the bolt-like working element. The extent of the longitudinal orientation is decisive for the bending elasticity, bending fatigue strength, and bend recovery the cleaning element. As shown in FIG. 2, the weakest point of the working element 2 is the transition region 5 to the carrier 4 since the molecular orientation is completely insufficient and, moreover, is produced substantially only close to the surface along the further length.

Figure 3:
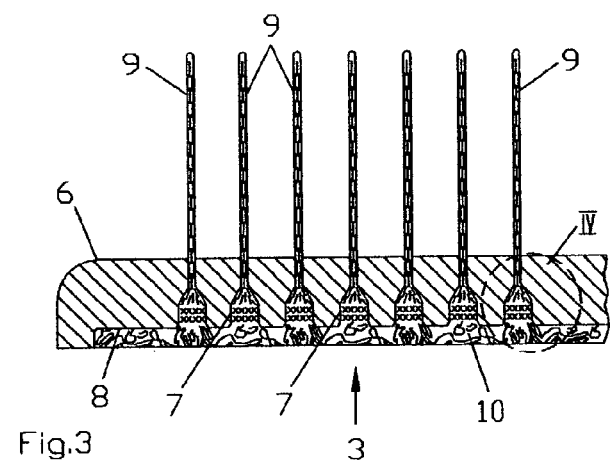
Figure 4:
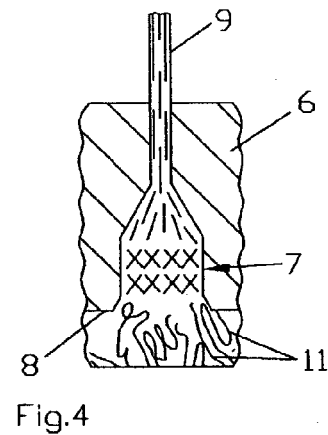

In accordance with the inventive method of FIGS. 3 and 4, a carrier 6 is initially shaped, thereby forming through holes 7 in the manner of spinning nozzles. Ideally, these through holes have a nozzle shape used in spinning technology. However, they may also have a simpler geometry to achieve, as do spinning processes, the primary goal of self-reinforcement through a longitudinal molecular orientation, which begins within the holes.

The carrier 6 of the embodiment shown comprises a depression 8 on its rear side from which the through holes 7 extend. The plastic melt for the bristles 9 is injected into the depression 8 from the injection side indicated with the directional arrow 3 and simultaneously injected through the through holes 7 into the molding channels (not shown) of an injection mold which will be described below. The bristles 9 are uniformly bonded with the plastic material 10 filling the depression 8 as shown in particular in FIG. 4. Since the through holes are shaped similar to spinning nozzles, the unoriented molecules 11 are initially pre-oriented when they enter the hole 7 and nearly completely extended in the longitudinal direction of the bristle 9 throughout the further path of the melt until they exit the carrier 6. The associated self-reinforcement (through molecular orientation) gives the bristle 9 properties similar to those exhibited by only extruded or spun monofilaments.

Figure 5:
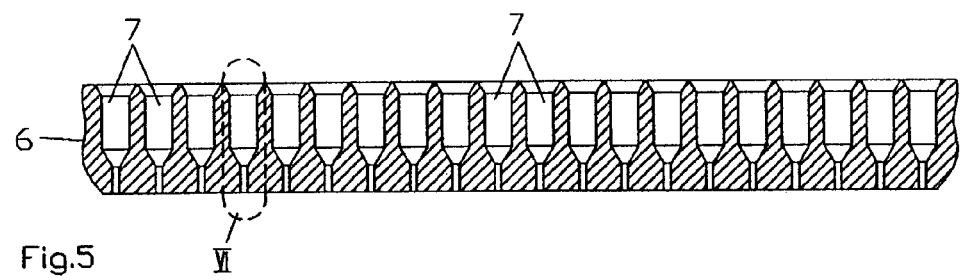
FIG. 5 shows a longitudinal section of a bristle carrier before mounting of the bristles.

FIG. 5 shows the complete carrier 6. It can form the body of a brush or at least part thereof and therefore have a corresponding contour. It is provided with a number of through holes 7 corresponding to the finished bristle stock of the brush, which are designed to form one, bristle each.

Figure 6:
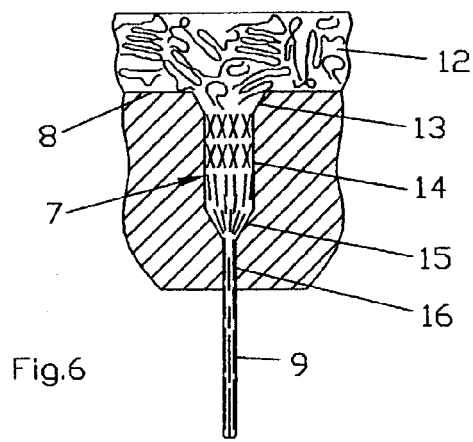
FIG. 6 shows an enlarged view of the detail VI of FIG. 5 after injection of the bristles.

The through holes are formed like spinning nozzles (FIG. 6 shows the ideal case). Using spinning technology terminology, the plastic melt produces the so-called melting cushion 12 in the depression 8, which passes into the insertion funnel in the form of a conically changing section 13. This insertion funnel maps into the guiding path 14 (also called shearing zone) of cylindrical cross-section, which passes, via a conical transition zone 15, into the so-called smoothing path 16 with reduced cross-section. The diameter to length ratio of the smoothing path is between 1:1 and 1:6. A hole 7 of this shape produces optimum stretching and longitudinal orientation of the molecules in the bristle 9.

To obtain a bristle-like structure, the smallest width of the through holes 7, e.g. along the smoothing path 16, should be ≦3 mm. The ratio between bristle length and the smallest cross-section of the hole 7 should be ≦1:5, preferably ≦1:10, wherein this ratio can be up to 1:250. Experiments have shown that a hole having substantially only the smooth path 16 with an entrance region tapering down to the diameter thereof and with a diameter to length ratio of 1:4 leads to an increase in injection velocity and wall friction of the melt flow to result in excellent self-reinforcement of the bristle. A larger diameter to length ratio e.g. 1:1 facilitates use of a thinner, in particular, more flexible carrier.

In a configuration of the hole 7 in accordance with FIG. 6, an entrance diameter of the entrance funnel of 8.5 mm and a smoothing path diameter of 0.5 mm increase the flow velocity of the melt by a factor of 28.5. The higher the velocity, the steeper the velocity distribution and the more prominent the shear forces, which are amplified to a further extent by the conical transitions.

The melt cushion 12 in accordance with FIG. 6 serves as a melt supply in conventional fiber spinning. In connection with the invention, it is also a melt reserve during injection of the bristles 9 and serves an additional distribution function. Moreover, additional melt is supplied into the through holes 7 and downstream molding channels as needed and in response to the conventional injection pressure, to obtain perfect shape filling. This melt cushion also forms a constructive part of the finished brush ware after injection in which the bristles 9 are integrated and which, together with the carrier, forms the layered structure shown in FIG. 3. Alternatively, the depression 8 can be subdivided along the carrier 6 for forming parallel bridges or gratings to which the bristles 9 are connected. In the case of a grating, this would be at the crossing points.

FIG. 7 shows a schematic representation of an embodiment of a brush wherein the carrier 6 is, similar to FIGS. 3 and 5, substantially plate-shaped and provided with the through holes 7 through which the bristles 9 are injected. The rear side of the carrier 6 is filled with the plastic material of the bristles 9 and connected to a broom body 17 either mechanically or through injection molding. The broom body 17 surrounds the edges of the carrier 6 and has a central handle casing 18 for a broom handle. The embodiment in accordance with FIG. 8 corresponds substantially to the one of FIG. 7, however, the handle casing 19 consists of the same plastic material as the bristles 9 and is injected in one piece therewith.

FIG. 9 shows part of an eyelash brush (mascara brush) wherein the carrier 20 has substantially the shape of a tube and is closed at a rounded end. The tube-shaped carrier 20 comprises narrow through holes 21 shaped as spinning nozzles (FIG. 10). The melt for the bristles is injected into the tube-shaped carrier 20 and penetrates through the through holes 21 into molding channels (not shown) of an injection mold thereby forming closely spaced thin bristles 9. The tube-shaped carrier is thereby completely filled with the plastic melt to produce a cylindrical core 21 for reinforcing the tube-shaped carrier 20. The carrier 20 and/or the core 21 can simultaneously form a handle at the right-hand side of FIG. 9.

The carrier 22 of the embodiment of FIG. 11 is a short cylinder with a rounded end having the substantially radially extending through holes 7. The through holes have a diameter/length ratio on the order of 1:1. In this case as well, the plastic melt for the bristles 9 is supplied from the inside and penetrates through the through holes 7 towards the outside thereby forming the bristles 9. Individual bristles 23 can also be hollow for guiding e.g. a liquid medium. In this case, the injection mold (not shown) is provided with displaceable pins between the molding channels for the bristles 9, which form the hollow space of the bristles, 23 and which are removed after injection of the bristles 9. Additional pins can be used to provide through holes between the bristles for dispensing a medium among the bristles. The inner coating 24 formed by the plastic melt on the inside of the carrier 22 reinforces the partially cylindrical carrier 22. Its inner space can be either completely or partially filled with a further plastic material. The plastic melt used therefor can also optionally serve as a filling for the hollow bristles 23 and also optionally be injected there through to exit at the opening of the hollow bristle 23 and form a bristle extension of another material. The embodiment in accordance with FIG. 11 is suitable e.g. for toilet brushes. Spherical brushes with only one injection point on the spherical carrier can also be produced in a similar fashion.

Figure 12:
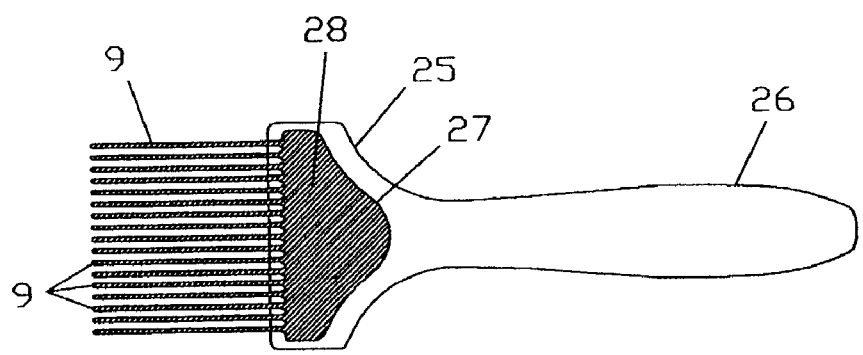
FIG. 12 shows a partially cut view of a flat brush.

FIG. 12 schematically shows a flat brush with a brush casing 25 and a handle 26 which are produced in one piece e.g. using injection or blow molding. The end face of the casing 25 has through holes, which extend from a hollow space 27 and are shaped like spinning nozzles. The plastic melt for the brush bristles 9 is injected into the hollow space 27 via one or two injection points. The melt penetrates through the through holes 7 into molding channels (not shown) of an injection mold thereby forming the bristles 9. At the same time, this plastic melt forms a core 28 which fills the hollow space 27, reinforces the casing 25, and forms a handle region. This reinforcement is particularly important for a blown brush body.

Figure 13:
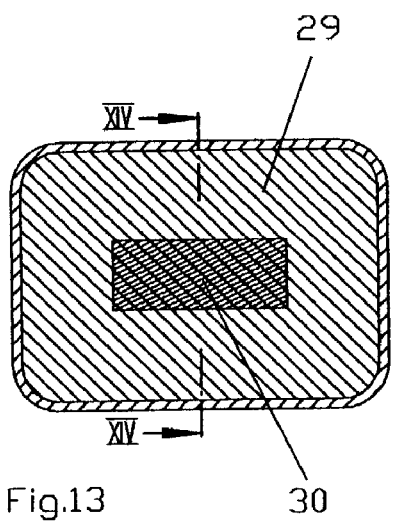
FIG. 13 shows a schematic top view onto a bristle stock of a square brush.
Figure 14:
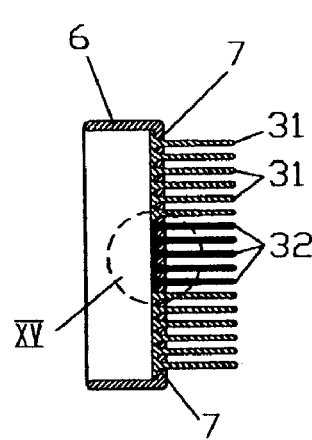
FIG. 14 shows a section XIV-XIV in accordance with FIG. 13.
Figure 15:
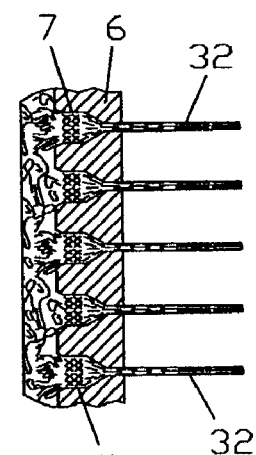
FIG. 15 shows an enlarged view of the detail XV of FIG. 14.
Figure 16:
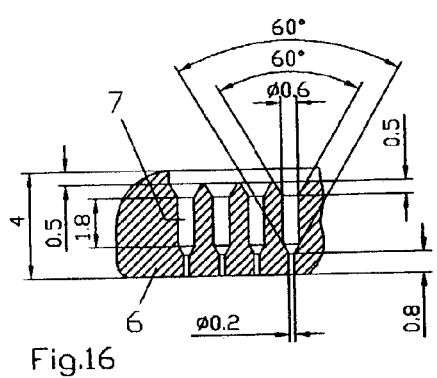
FIG. 16 shows a partial section of a carrier having a first geometrical shape of the holes.
Figure 17:
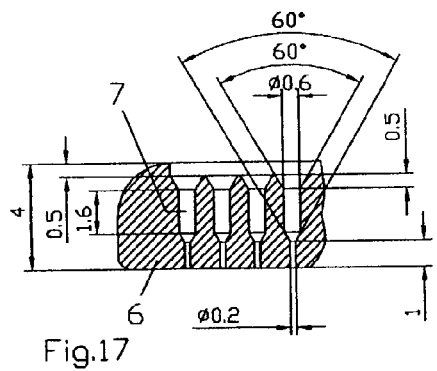
FIG. 17 shows a partial section of a carrier having a second geometrical shape of the holes.
Figure 18:
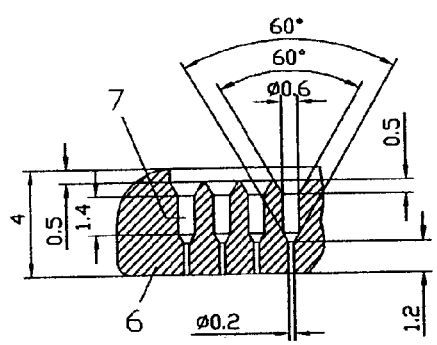
FIG. 18 shows a partial section of a carrier having a third geometrical shape of the holes.
Figure 19:
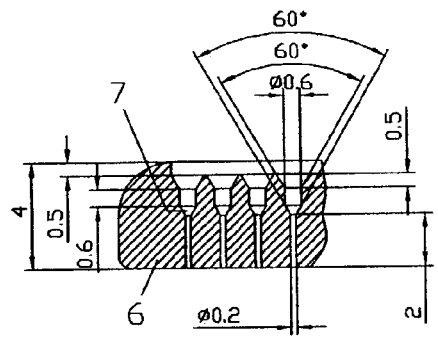
FIG. 19 shows a partial section of a carrier having a fourth geometrical shape of the holes.

FIG. 13 shows a substantially square hand brush or a support therefor which could also be the head of a paintbrush. The carrier 6 herein is a prefabricated frame, which is open on one side and has through holes 7 on the closed side. The bristle stock consists of an outer bristle field 29 and an inner bristle field 30 which are hatched in FIG. 13 for clarity. In a one or two-step injection mold process, a first plastic melt is injected through the through holes 7 lying within the bristle field 29 and another plastic melt is injected through the through holes 7 lying in the second bristle field 30 to produce bristles 31 or 32 with different mechanical and/or physical properties. The outer bristles 31 can have a larger diameter than the inner bristles 32 (shown on an enlarged scale in FIG. 15). They can also have with different fillers or color.

FIGS. 16 through 19 show different constructive embodiments of the carrier 6 with through holes 7 wherein the dimensions are given in millimeters. These dimensions generate a particularly prominent spinning nozzle effect, wherein the terminology used in connection with FIG. 6 is characteristic in spinning technology. The insertion funnels and transition zone of all embodiments in accordance with FIGS. 16 through 19 have a conical angle of 60°. The opening diameter of the insertion funnel and the inlet diameter of the transition zone and therefore the diameter of the guiding path, also referred to as shearing zone, is 0.6 mm in each case. The melt cushion has a thickness of 0.5 mm and the diameter of the smoothing path is 0.2 mm in all four cases. The through holes 7 have differing guiding and smoothing path lengths. These are, respectively, 1.8 and 0.88 mm for FIG. 16, 1.6 and 1.0 mm for FIG. 17, 1.4 and 1.2 mm for FIG. 18 and 0.6 and 2.0 mm for FIG. 19. The longitudinal molecular orientation of the melt is effected, in particular, by the guiding and smoothing path lengths where the shear flow is large due to wall friction.

Figure 20:
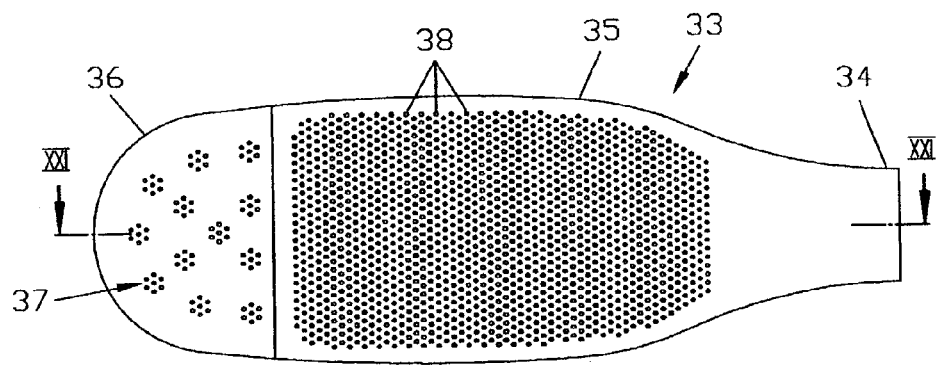
FIG. 20 shows a top view onto a bristle stock of a toothbrush head.
Figure 21:
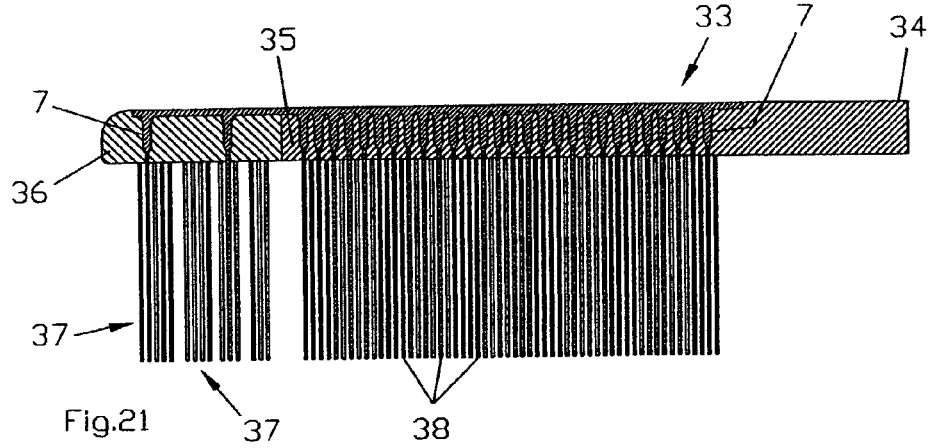
FIG. 21 shows a longitudinal section XXI-XXI of the toothbrush head in accordance with FIG. 20.

FIGS. 20 and 21 show a toothbrush head 33, which can be injected in one piece with the toothbrush handle 34 (not shown in detail). The tooth brush head 33 consists of a part 35 close to the handle and a front part 36 separated therefrom which both form the carrier for the bristles, wherein the front part 36 is injected from a softer, e.g. rubber-elastic plastic material. The two parts 35 and 36 have a depression on their rear side into which the plastic melt for the bristles is injected. The front head part 36 of the bristle stock consists of bundles 37 each formed of individual bristles and the part 35 close to the handle consists of closely adjacent individual bristles 38. The parts 35 and 36 of the brush head forming the carrier have through holes 7 for shaping the plastic melt injected on the optionally recessed rear side. The bristles forming the bundles 37 and the closely adjacent bristles 38 can thereby consist of plastic materials having different properties, color, etc.

Figure 22:
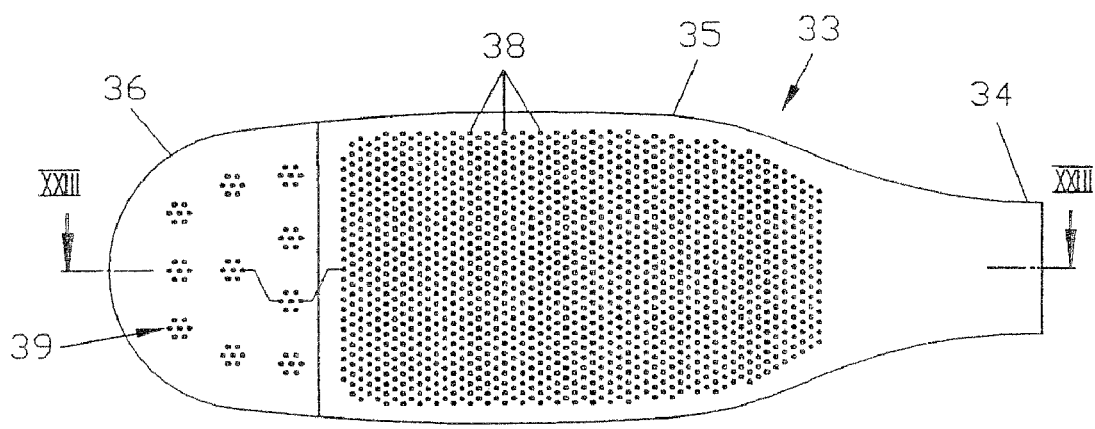
FIG. 22 shows a top view onto another embodiment of the bristle support of a toothbrush head.
Figure 23:
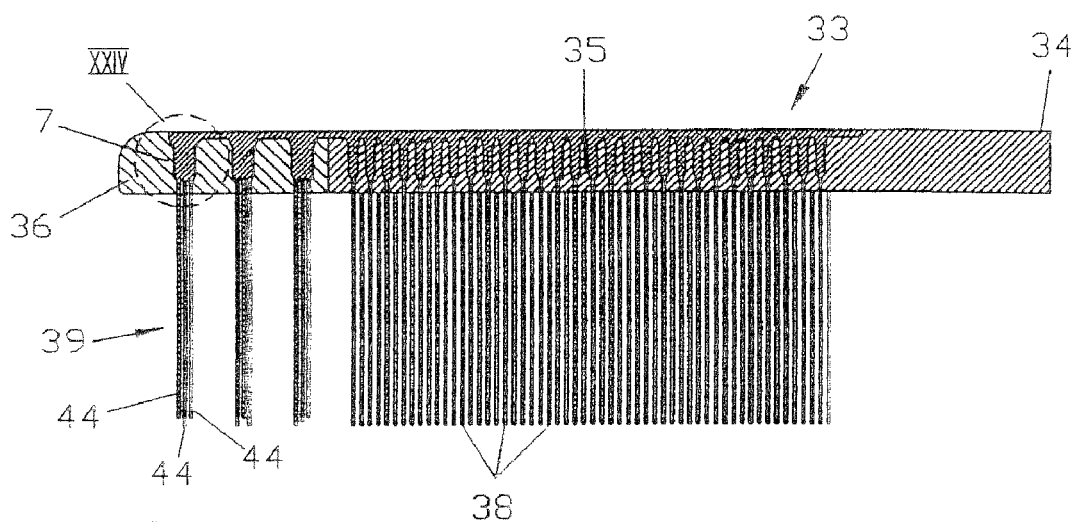
FIG. 23 shows a longitudinal section of the toothbrush head in accordance with FIG. 22.
Figure 24:
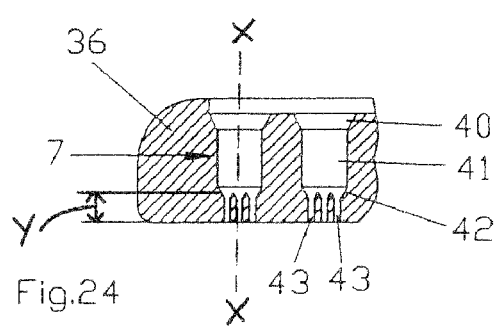
FIG. 24 shows an enlarged view of the detail XXIV of FIG. 23 before injecting the bristles.

FIGS. 22 and 23 show the head of a toothbrush. Only differences in comparison to FIGS. 20 and 21 are described. In this case, the front part 36 also comprises bundles 39, however, the through holes 7 for producing them have a different design. One single hole is used for forming a bundle, as shown in FIG. 23. FIG. 24 shows the cross-section of these through holes in an enlarged scale. They have an insertion funnel 40, a guiding path 41 and a transition zone 42, which maps into several adjacent smoothing paths 43. As shown in FIG. 24, each of the plurality of smoothing paths 43 have a longitudinal length X which is parallel to he axis Y of the through hole 7. The number of smoothing paths 43 corresponds to the number of bristles within the bundle 39 (FIGS.

22 and 23). The individual bristles 44 within the bundle 39 can have differing lengths such that the ends lie on a sloped or curved envelope surface (see FIG. 23). The ends are precisely rounded.

Figures 25, 26, 27, 28, 29:
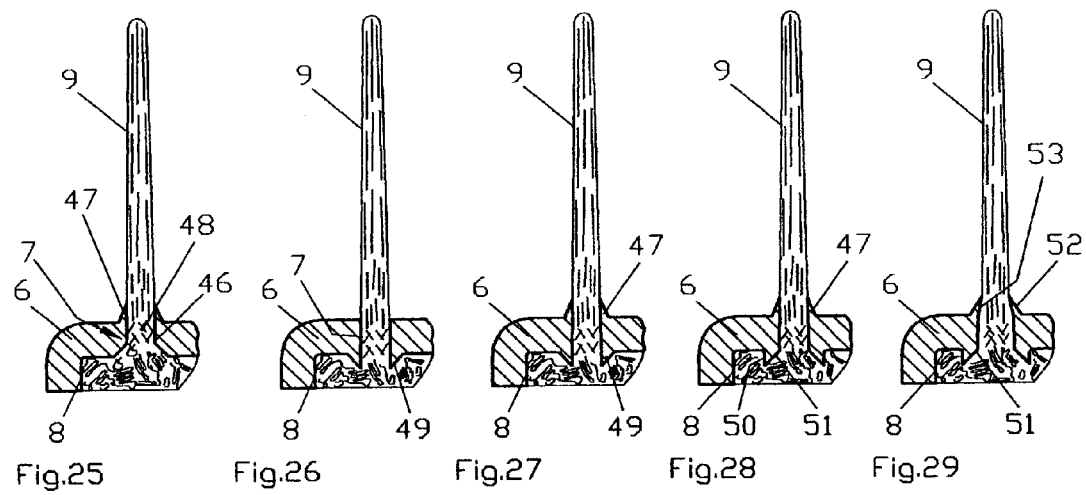
FIG. 25 shows a partial cross-section of a carrier with injected bristles having a first embodiment of the holes.
FIG. 26 shows a partial cross-section of a carrier with injected bristles having a second embodiment of the holes.
FIG. 27 shows a partial cross-section of a carrier with injected bristles having a third embodiment of the holes.
FIG. 28 shows a partial cross-section of a carrier with injected bristles having a fourth embodiment of the holes.
FIG. 29 shows a partial cross-section of a carrier with injected bristles having a fifth embodiment of the holes.

In the above-described embodiments, the shape of the through holes 7 is substantially matched to the proportions of a spinning nozzle. The molecular orientation effect can already be achieved with a simpler cross-sectional design for the through holes as shown in FIG. 11, FIGS. 25 through 29 and 31. In accordance with FIG. 25, the carrier 6 has a hole 7 which joins the depression 8 with a conically narrowing section 45 corresponding to the insertion funnel, followed by a substantially cylindrical, optionally slightly conical section 46 which continues into a collar 47 on the carrier thereby producing a longer shearing zone. At the same time, the region 48 of the bristle 9 where the molecular orientation has not yet or only insufficiently taken place, is wrapped within the collar 47 of the carrier 6. The embodiment is accordance with FIG. 26 differs from FIG. 25 in that the carrier has a collar 49 extending into the depression 8 whereas FIG. 27 shows an external and internal collar 47 or 49 and the internal collar 50 of FIG. 28 has an additional insertion funnel 51. Finally, the embodiment of FIG. 29 is modified with respect to FIG. 28 in that the carrier 6 has an external collar 52, which tapers in an inward direction 53 to produce additional confinement of the plastic melt.

Figure 30:
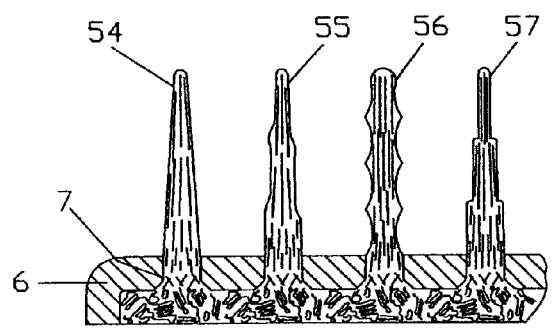
FIG. 30 shows a partial cross-section of a carrier with bristles of different designs.

FIG. 30 shows different embodiments of bristles resulting from through holes 7 on the carrier 6 having the same shape, namely a smooth-walled, conically extending bristle 54, a bristle 55 with irregular longitudinal profile, a bristle 56 with uniform longitudinal profile, and a stepped, tapering bristle 57. These can be produced through injection molding with layered plates, as will be described below.

Figures 31, 32:
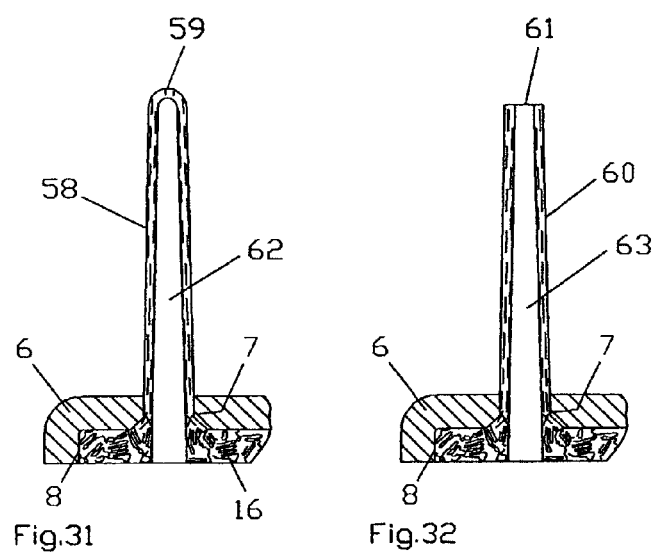
FIG. 31 shows a partial cross-section of a carrier with injected-through hollow bristle.
FIG. 32 shows a partial cross-section in accordance with FIG. 31 with a bristle of another embodiment.

FIGS. 31 and 32 show a carrier 6 with through holes 7 and depressions 8 as described before, wherein the injected bristles are formed as hollow bristles 58 with closed ends 59 or as hollow bristle 60 with open ends 61. The hollow space 62 or 63 is obtained by disposing displaceable shaping pins (not shown) at the injection side, which are introduced through the through holes and the molding channels (not shown) prior to extruding the bristles. The plastic melt for the bristles 58 or 60 injected into the depression 8 is annularly injected through the through holes 7 between the molding channel and the inserted pin, wherein a longitudinal orientation on the inner wall of the molding channel and on the wall of the shaping pin is effected due to wall friction and increased melt speed such that self-reinforcement through longitudinal molecular orientation is ensured over the entire cross-section and length of the hollow bristle.

Figure 33:
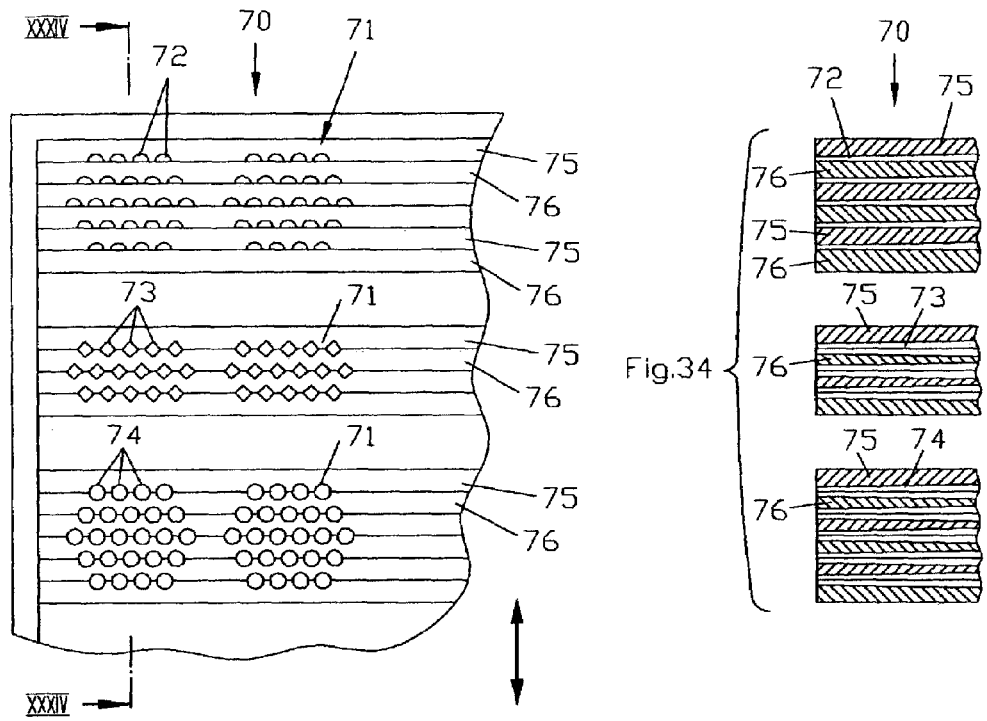
FIG. 33 shows a schematic view of the injection side of an injection mold with molding channels of different embodiments.
Figure 35:
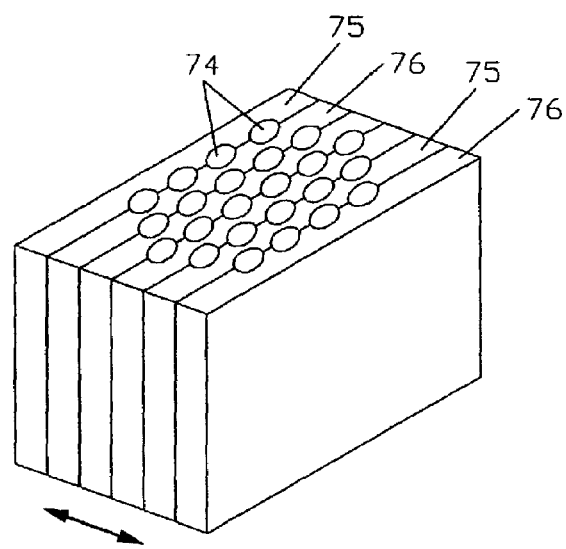
FIG. 35 shows a schematic perspective view of a part of the injection mold in accordance with FIG. 33.

FIGS. 33 through 35 schematically show part 70 of a multiple-component injection mold, wherein this part comprises the molding channels 71 for the bristles which are each disposed in correspondence with the arrangement of the bristles in the bristle stock of the finished brush ware. The upper part of the representation shows molding channels 72 having a semi-circular cross-section, the central part shows molding channels 73 with square cross-section and the lower part shows molding channels 74 with circular cross-section. The injection mold 70 consists of plates, which are layered parallel to the molding channel of which neighboring plates 75, 76 form part of each molding channel. With smaller cross-sections and larger length of the molding channels 71, which makes removal in the direction of the molding channels difficult, the plates 75,76 can be slightly displaced in the direction of the double arrow.

Figure 36:
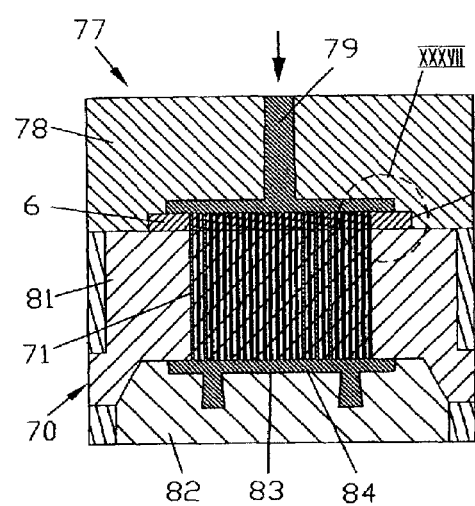
FIG. 36 shows a section through a multiple-component injection-molding unit in the injecting phase.
Figure 37:
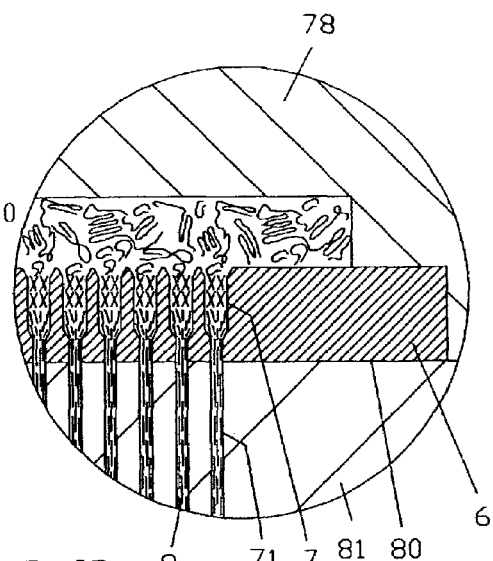
FIG. 37 shows an enlarged view of the detail XXXVII in accordance with FIG. 37.
Figure 38:
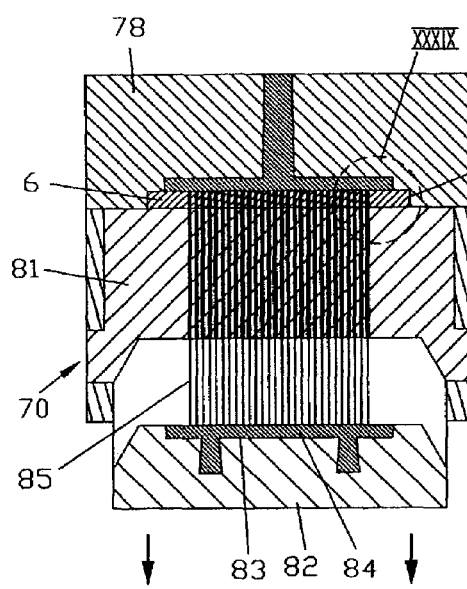
FIG. 38 shows the injection-molding unit in accordance with FIG. 36 after the injection phase and during stretching of the bristles.
Figure 39:
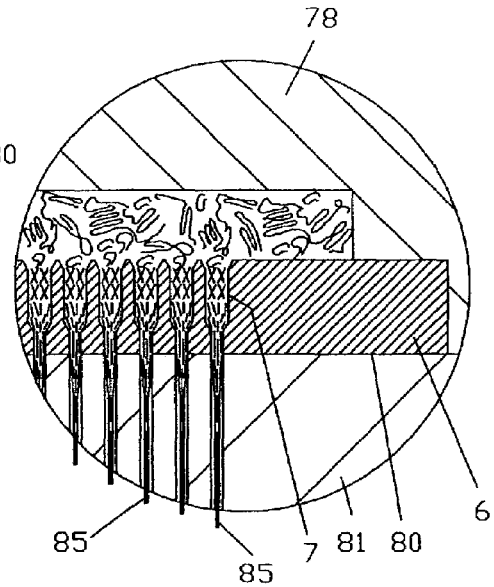
FIG. 39 shows an enlarged view of the detail XXXIX in accordance with FIG. 38.
Figure 40:
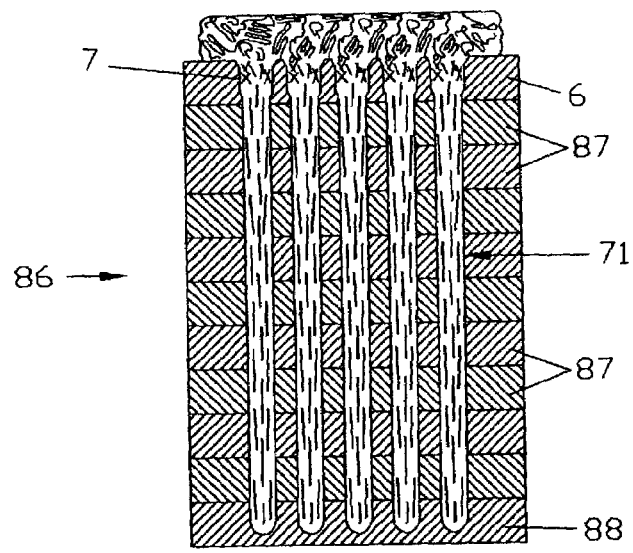
FIG. 40 shows a section through an injection mold with molding channels in each injection phase.

FIG. 36 shows an injection mold unit 77 with a multiple-component injection mold whose normally stationary part 78 has a supply channel 79 for the plastic melt of the bristles and a molding space 80 in which the pre-fabricated carrier 6 with through holes is inserted or directly produced through injection. The further displaceable part 81 has the molding channels 71 for forming the bristles. The embodiment shown finally comprises a third part 82 with a cavity 83 into which the melt injected via the feed channel 79 through the through holes (not shown) of the carrier 6 and into the molding channels 71 enters to fill this cavity and form a plate-like abutment 84. FIG. 37 shows details in the region of the mold-separating plane between the parts 78 and 81 of the injection mold unit 77. After injection molding, the part 82 with the plate-shaped abutment 84, which connects the ends of the bristles 9, is first displaced in the direction of the arrows such that the bristles 9 are stretched thereby producing bristles 85 having a further improved longitudinal orientation of the molecular chains. Stretching can be carried out directly after injection molding or after a certain time depending on the plastic material and the geometrical dimensions of the molding channels, i.e. the produced bristle geometry.

Figure 41:
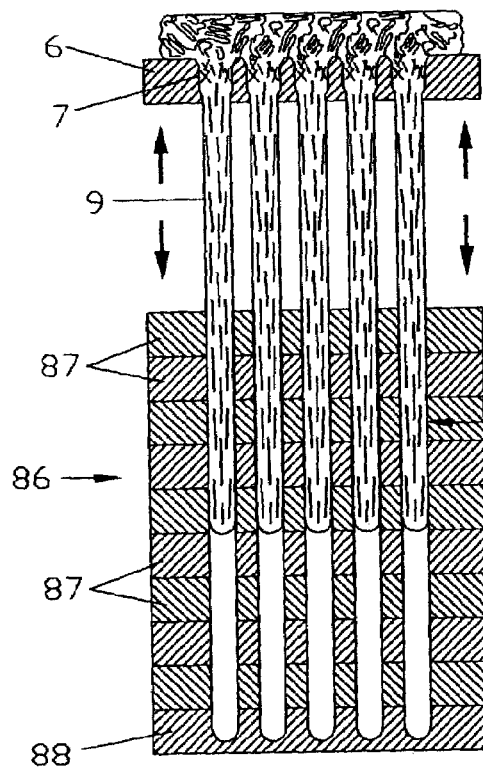
FIG. 41 shows the injection mold in accordance with FIG. 40 during removal.
Figure 42:
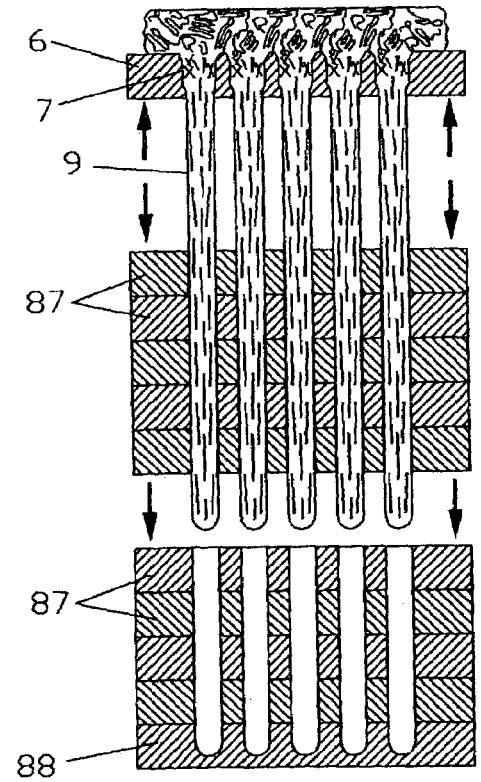
FIG. 42 shows the injection mold in accordance with FIG. 40 during gradual removal.

FIGS. 40 through 49 show an injection mold 86 having molding channels 71 which consists of individual plates 87 layered transverse to the axis of the molding channels 71, and an end plate 88 wherein the plates 87 each constitute a longitudinal section of the molding channel 71. The end plate 88 forms the bristle ends. The plastic melt is also injected through the through holes 7 of the carrier 6 into the molding channels 71 until it reaches the end plate 88. Ventilation can occur in the separating plane between the plates 87—as is known from conventional injection molding in the mold separation plane. The plates 87 and 88 can be displaced with respect to the carrier 6 or the stationary part of the injection mold either individually or, as shown in FIGS. 41 and 42, in groups. This can be effected in one step (see FIG. 41). However, the end plate 88 is preferably removed first, optionally together with the directly following plates 87, and the bristles 9 are initially removed in a region of their ends and subsequently along their remaining lengths.

As is indicated with the double arrow in FIG. 41, the plates 87, 88 can also be displaced in an oscillating manner transverse to the molding channels 71 or rotated so that the bristles are subjected to an alternating bending loading relative to the carrier 6 which leads to a self-reinforcement near the surface of the bristle at the bending location to further improve the flexibility and bend recovery of the bristle.

The end plate 88 is preferably exchangeable to form either an abutment for stretching or different contours on the bristles 9. FIG. 43 shows such an end plate 88 having rounded enlargements 89 to form e.g. a round head on the bristles 9. For removing the bristles, this end plate 88 is also segmented parallel to the molding channels as described in connection with FIGS. 33 through 35. If the rounded head 90 is merely an abutment for stretching the bristles 9, which is to be subsequently removed, this can also be effected through transverse displacement of the end plate 8, which then functions as a cutting plate.

FIG. 44 shows another embodiment of the end plate 88. It also has rounded enlargements 91 which have a longitudinal profile 92 on their injection side. For mold removal, the end plate 88 is first removed and the heads formed in the rounded enlargement 91 are reshaped to be parallel to the bristles while simultaneously being provided with a longitudinal profile 93. Mold removal in the manner described in connection with FIGS. 41 and 42 then follows.

Figure 46:
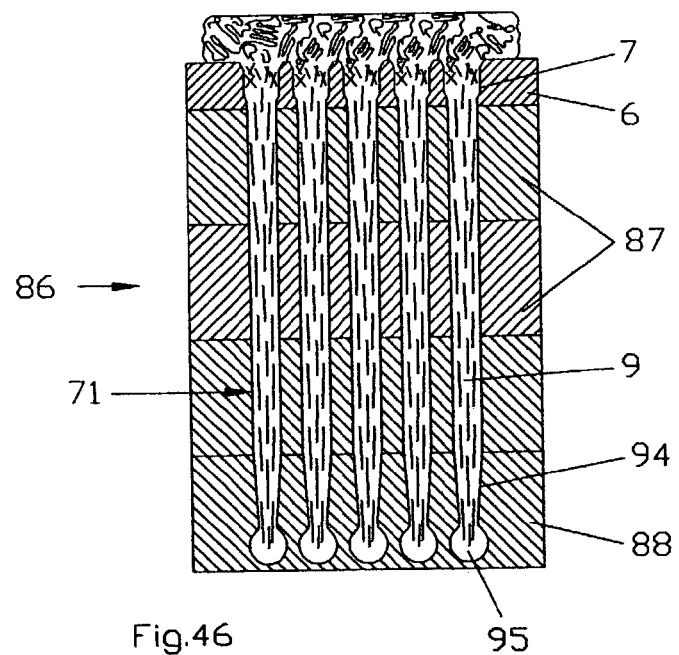
FIG. 46 shows a further embodiment of an injection mold in the injection phase.
Figure 47:
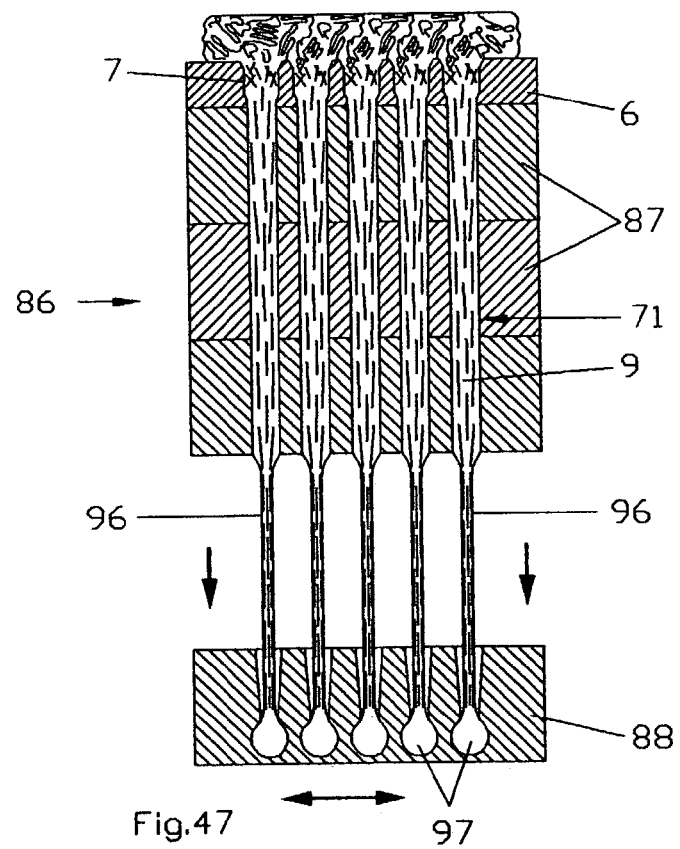
FIG. 47 shows the injection mold in accordance with FIG. 46 during stretching of the bristles.

FIGS. 46 and 47 show still another embodiment of the end plate 88 having a section 94 with increased conical tapering and a subsequent enlargement 95 such that the injected through bristle 9 comprises a firstly narrowed and subsequently thickened end. Through removal of the end plate 88 only the front part of the bristle is stretched as shown in FIG. 47 and its diameter is reduced such that the produced bristle is thinner in the front region 96 than in the other region but has high bending fatigue strength due to the additional stretching. The end plate 88 is also segmented to remove the thickened ends 97 of the bristles. If the thickened ends 97 serve only as abutment for stretching, they are subsequently separated. In this case as well, an oscillating transverse motion of the end plate 88 can introduce an alternating bending loading in the region of reduced bristle cross section in the transition to region 96 to provide a reserve degree of flexibility.

Figure 48:
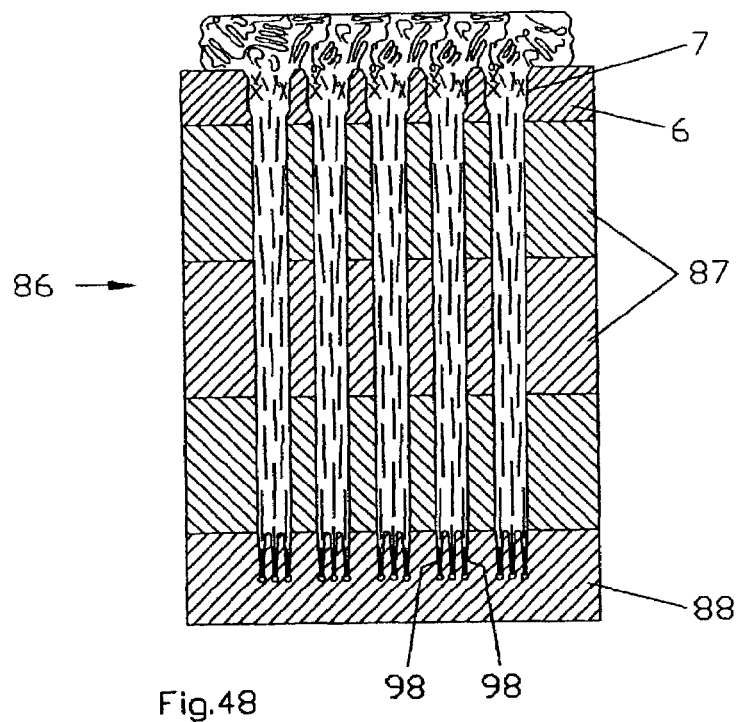
FIG. 48 shows a further embodiment of an injection mold with molding channels in the injection phase.
Figure 49:
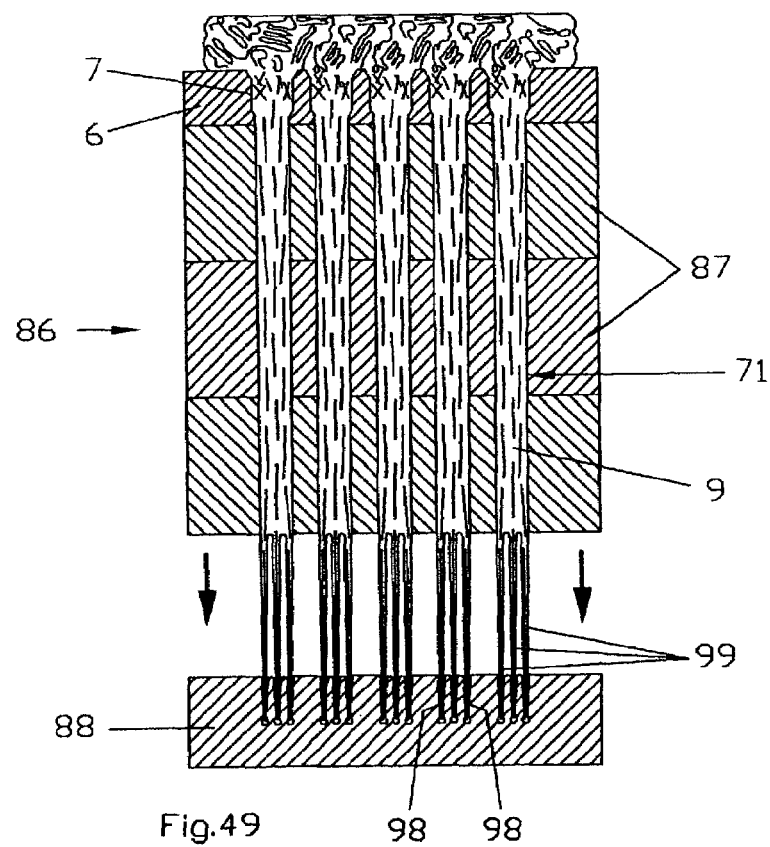
FIG. 49 shows the injection mold in accordance with FIG. 48 during stretching of the bristles.

FIGS. 48 and 49 show an injection mold 86 for producing so-called finger bristles. In this case, the end plate 88 of the plates 87 of each molding channel 71 has several molding channels 98 of a smaller cross-section which conically taper from the separating plane between the end plate 88 and the next plate 87 and being optionally provided with small enlargements at the end. For removal, the end plate 88 is first displaced thereby sizing and stretching the plastic mass located in the molding channels 98. Each individual bristle 9 comprises finger-like extensions 99 at its end.

Figure 50:
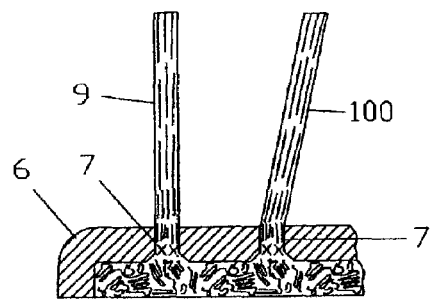
FIG. 50 shows a partial section through a carrier with injected-through bristles.
Figure 51:
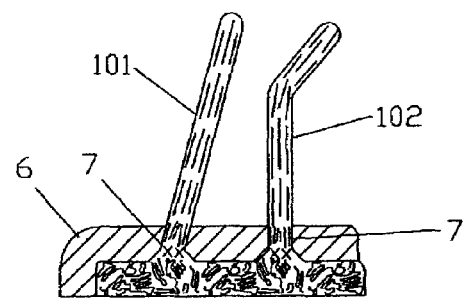
FIG. 51 shows a partial cross-section of a carrier with injected-through bristles.

The molding channels 71 in the injection mold 86 can be aligned with the through holes 7 in the carrier 6 such that the bristles 9 extend perpendicular to the carrier 6 as shown in FIG. 50. The molding channels can also be disposed on the carrier 6 at an angle with respect to the through holes 7 to produce a bristle 100 extending at a corresponding angle. FIG. 51 shows an embodiment wherein the carrier 6 comprises a bristle 101 disposed at an angle and a bent bristle 102 formed by a bend in the corresponding molding channel.

Figures 52, 53, 54:
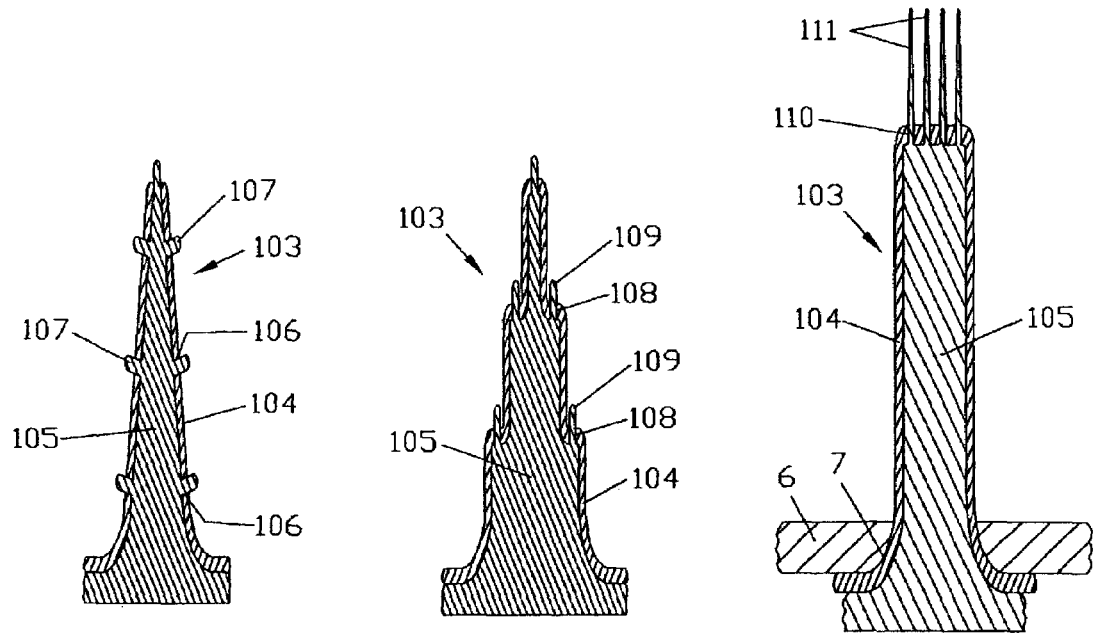
FIG. 52 shows a longitudinal section of a two-component bristle.
FIG. 53 shows a longitudinal section in accordance with FIG. 52 of a two-component bristle in another embodiment.
FIG. 54 shows a third embodiment of a two-component bristle.
Figure 63:
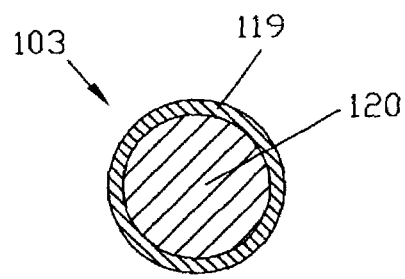
FIG. 63 shows a cross-section of a first embodiment of the multiple-component bristle.

Finally, FIGS. 52 through 54 show some embodiments of composite bristles, which can be produced in accordance with the inventive method. FIG. 52 shows a composite bristle 103 which is formed of a hollow bristle 104 and a core bristle 105. The hollow bristle 104, described with reference to FIGS. 31 and 32, can be injected through annular guiding of the melt through the through holes 7 of the carrier 6 and the core bristle 105 is then injected into the hollow core. In the present embodiment, the hollow bristle 105 comprises perforated holes 106 through which the plastic material of the core bristle 105 outwardly penetrate to form projections 107. The composite bristle 103 in accordance with FIG. 53 consists of a hollow bristle 104 and a core bristle 105 with perforations 108 on the hollow bristle 104 extending in the injection direction through which the melt of the core bristle 105 extrudes to form finger-like projections 109.

In the embodiment in accordance with FIG. 54, the composite bristle 103 consists of a hollow bristle 104 and a core bristle 105, wherein the hollow bristle comprises perforations 110 at its end through which the melt of the core bristle 105 extrudes to form finger-like projections 111.

FIGS. 55 through 62 show different embodiments of concentric mold elements 140 of an injection mold in cross-section and longitudinal section. FIG. 55 shows a profiled core mold 112 which is e.g. channeled parallel to the axis, and a hollow cylindrical annular mold 113 which define the molding channels 114 at their mutually facing peripheries. FIG. 59 shows the associated longitudinal section. The mold element 140 in accordance with FIG. 56 consists of a core mold 116 and an annular mold 115 both of whose facing surfaces are channeled in the longitudinal direction to define intermediate mold channels 117 having a circular cross-section. FIGS. 57 and 61 and FIGS. 58 and 62 show mold elements 140 having a plurality of concentric dispositions to generate a concentric configuration of molding channels 114, 117. These mold elements 140, which can constitute an independent injection mold or a portion of an injection mold in accordance with FIGS. 36 to 42, can be used to produce a bundled configuration of bristles. These bordering components 112, 113 can preferably be axially displaceable relative to each other, e.g. sequentially from the inside towards the outside, to remove the bristles from the mold following injection of the melt through the carrier through holes and into the molding channels 114, 117.

FIGS. 63 to 68, illustrate additional variants of composite bristles. The composite bristle 103 in accordance with FIG. 63 consists of a massive core 119 and a thin jacket 120 which can be made from different plastic materials or from filled or not filled plastic materials, as described above for composite bristles. The thin jacket 120 can produce a display of wear in connection with the core 119 as the core 119 becomes exposed with increasing wear.

Figure 64:
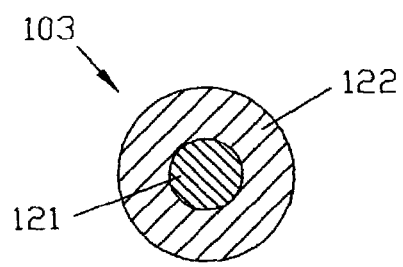
FIG. 64 shows a cross-section of a second embodiment of the multiple-component bristle.
Figure 65:
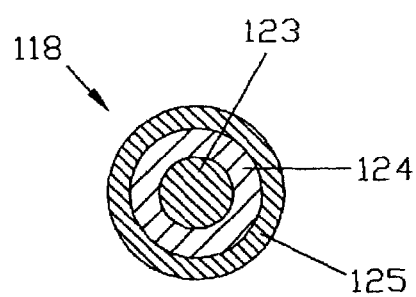
FIG. 65 shows a cross-section of a third embodiment of the multiple-component bristle.

The composite bristle 103 in accordance with FIG. 64 consists of a core 121 and a jacket 122, which is thicker than that of FIG. 61, whereas the three-fold composite bristle 118 consists of a core 123 and an intermediate layer 124 and a jacket 125.

Figure 66:
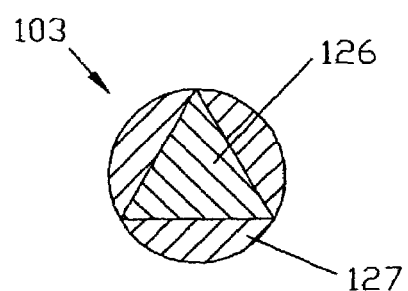
FIG. 66 shows a cross-section of a fourth embodiment of the multiple-component bristle.
Figure 67:
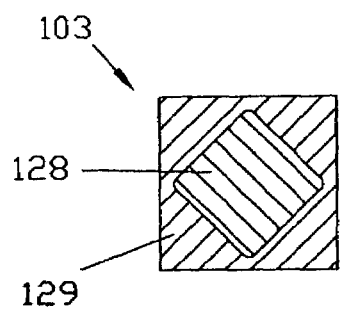
FIG. 67 shows a cross-section of a fifth embodiment of the multiple-component bristle.
Figure 68:
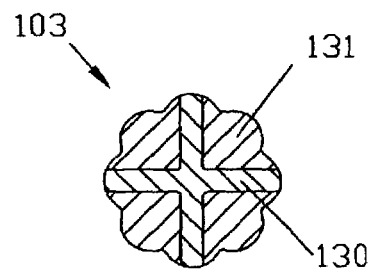
FIG. 68 shows a cross-section of a sixth embodiment of the multiple-component bristle.
Figure 69:
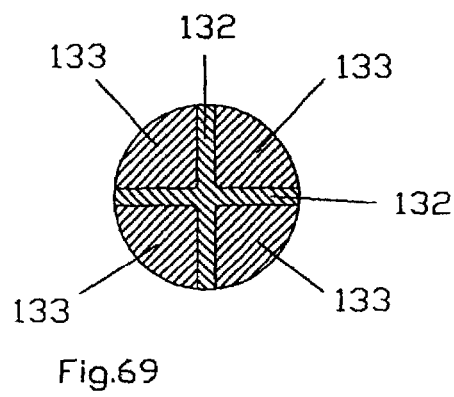
FIG. 69 shows a cross-section of a cleavable bristle.

The cross-section of the core and covering bristle must not necessarily be circular. FIG. 66 shows a composite bristle 103 with a triangular core 126 and a jacket 127 supplementing same into a circular shape, whereas FIG. 67 shows a composite bristle 103 with a triangular cross-section with the core 128 being oriented diagonally with respect to the square cover 129. FIG. 68 shows a composite bristle with a longitudinal profile wherein the cross-shaped core 130 extends to the periphery of the second component 131 which otherwise fills the cross-shaped portion. The different hardness and/or different filling of the plastic materials for the core 130 and the cover 131 produces harder working surfaces on the exposed ends of the cross-shaped core. Finally, FIG. 69 shows a composite bristle 103 whose secondary binding forces are reduced through incorporated border layers 132. These are reduces during use or arbitrarily through mechanical forces such that the bristle is split into sector-shaped fingers 133.

I claim:

1. A brush ware comprising:
   a carrier having a plurality of through holes from which bristles extend;
   wherein at least one of the through holes has a minimal width of ≦3 mm along at least a portion of its depth;
   wherein each of said bristles are formed from a thermoplastic material and have a maximum width transverse to a longitudinal axis thereof of ≦3 mm;
   wherein a ratio R between said transverse width and a bristle length is ≦1:5,
   wherein said at least one of said through holes has an insertion funnel, a cylindrical hollow guiding path and a transition zone, all of which communicate with a plurality of cylindrical hollow smoothing paths extending down through said through hole, the number of smoothing paths corresponding to a number of bristles of a bundle of said bristles each of which extend out and down from said through hole and a respective smoothing path,
   wherein the longitudinal length of each of the plurality of smoothing paths is parallel to the axis of the through hole, and wherein, the upper diameter of the guiding path, the transition zone, and each of the plurality of smoothing paths progressively decrease relative to that of the insertion funnel, and wherein, the upper diameter of the guiding path, the transition zone and each of the plurality of smoothing paths progressively decrease relative to that of the insertion funnel.

2. The brush ware of claim 1, wherein $1:250 \leqq R \leqq 1:10$.

3. The brush ware of claim 1, wherein a cross-section of said bristles is less than or substantially equal to a cross section of said through holes.

4. The brush ware of claim 1, wherein at least some of said bristles are hollow.

5. The brush ware of claim 1, wherein free ends of said hollow bristles are open.

6. The brush ware of claim 1, wherein free ends of said hollow bristles are closed.

7. The brush ware of claim 1, wherein said hollow bristles surround and are filled by core bristles.

8. The brush ware of claim 1, wherein said hollow bristles surround and are filled by core bristles made from another plastic material.

9. The brush ware of claim 1, wherein said hollow bristles have perforations and surround said core bristles, wherein said core bristles pass through said hollow bristle perforations to form protrusions on an outside of said bristles.

10. The brush ware of claim 1, wherein at least some of said bristles have finger-like extensions.

11. The brush ware of claim 1, wherein at least some of said bristles comprises a plastic material filled with at least one of particles and fibers.

12. The brush ware of claim 1, wherein at least part of said bristles have structures which extend substantially parallel to a bristle axis to reduce secondary binding forces transverse to a molecular orientation of said bristles.

13. The brush ware of claim 12, wherein said bristles can be detached along said structures into finger members.

14. The brush ware of claim 1, wherein at least part of said bristles are made from an energy-conducting plastic material.

15. The brush ware of claim 14, wherein at least a core region of said bristles is made from a transparent, light-guiding plastic material.

16. The brush ware of claim 1, wherein said carrier has at least one depression and at least one through hole begins at each of said at least one depression, wherein said at least one depression is filled with a plastic material of said bristles.

17. The brush ware of claim 1, wherein at least one of said carrier and said bristles are made from different plastic materials.

18. The brush ware of claim 1, wherein at least a portion of said carrier has several layers.

19. The brush ware of claim 1, wherein said carrier is at least partially made from a flexible rubber-elastic plastic material.

20. The brush ware of claim 1, wherein said bristles are made from a plastic having antibacterial properties.

21. The brush ware of claim 1, wherein said carrier has antibacterial properties.

* * * * *

UNITED STATES PATENT AND TRADEMARK OFFICE
CERTIFICATE OF CORRECTION

PATENT NO. : 7,503,093 B2  Page 1 of 1
APPLICATION NO. : 10/311799
DATED : March 17, 2009
INVENTOR(S) : Weihrauch It is certified that error appears in the above-identified patent and that said Letters Patent is hereby corrected as shown below:

In Claim 1, at column 22, lines 64-67, cancel the text reading, "wherein, the upper diameter of the guiding path, the transition zone and each of the plurality of smoothing paths progressively decrease relative to that of the insertion funnel, and"

Signed and Sealed this

Seventeenth Day of November, 2009

David J. Kappos
*Director of the United States Patent and Trademark Office*